(12) United States Patent
Saeki et al.

(10) Patent No.: US 8,696,474 B2
(45) Date of Patent: Apr. 15, 2014

(54) TORQUE FLUCTUATION ABSORBER

(75) Inventors: Tomohiro Saeki, Anjo (JP); Satoshi Nakagaito, Kariya (JP); Naoko Hayasaka, Nukata-gun (JP); Naoki Tachiuchi, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/420,129

(22) Filed: Mar. 14, 2012

(65) Prior Publication Data

US 2012/0264522 A1 Oct. 18, 2012

(30) Foreign Application Priority Data

Mar. 15, 2011 (JP) ................. 2011-056701

(51) Int. Cl.
*F16D 7/02* (2006.01)
*F16F 15/134* (2006.01)

(52) U.S. Cl.
USPC ........................................ 464/46; 464/68.41

(58) Field of Classification Search
USPC ........ 464/45, 46, 68.1, 68.4, 68.41; 192/55.1, 192/56.6, 210.1, 213.12, 213.22, 213.31, 192/214.1
See application file for complete search history.

(56) References Cited

U.S. PATENT DOCUMENTS

| | | | | |
|---|---|---|---|---|
| 4,184,578 A | * | 1/1980 | Moore et al. | |
| 4,362,230 A | * | 12/1982 | Martinez Corral | |
| 4,770,282 A | * | 9/1988 | Maycock et al. | |
| 5,351,796 A | * | 10/1994 | Uenohara | |
| 5,385,224 A | * | 1/1995 | Uehara | |
| 6,874,607 B2 | * | 4/2005 | Mensch et al. | |
| 7,207,887 B2 | | 4/2007 | Nakagaito et al. | |
| 7,425,181 B2 | | 9/2008 | Nakagaito et al. | |
| 2010/0248846 A1 | | 9/2010 | Saeki et al. | |

FOREIGN PATENT DOCUMENTS

JP 2005-127507 A 5/2005

* cited by examiner

*Primary Examiner* — Gregory Binda
*Assistant Examiner* — Josh Skroupa
(74) *Attorney, Agent, or Firm* — Buchanan Ingersoll & Rooney PC

(57) ABSTRACT

A torque fluctuation absorber includes a first annular member, a second annular member arranged to be axially separated from the first annular member, an annular and dish-shaped first disc spring arranged between the first annular member and the second annular member, a first support portion arranged between the first annular member and the first disc spring and being partially or continuously in contact with the first disc spring on a circle passing through a first predetermined radial portion of the first annular member, and a second support portion arranged between the second annular member and the first disc spring and being partially or continuously in contact with the first disc spring on a circle passing through a second predetermined radial portion of the second annular member, the second predetermined radial portion being radially different from the first predetermined radial portion of the first annular member.

2 Claims, 16 Drawing Sheets

TORQUE FLUCTUATION ABSORBER

CROSS REFERENCE TO RELATED APPLICATIONS

This application is based on and claims priority under 35 U.S.C. §119 to Japanese Patent Application 2011-056701, filed on Mar. 15, 2011, the entire content of which is incorporated herein by reference.

TECHNICAL FIELD

This disclosure generally relates to a torque fluctuation absorber, which absorbs torque fluctuations generated between rotational shafts.

BACKGROUND DISCUSSION

A known torque fluctuation absorber is provided, for example, on a drivetrain between an engine and a transmission. The known torque fluctuation absorber absorbs (restrains) torque fluctuations between the engine and the transmission. The known torque fluctuation absorber includes, for example, a damper portion that absorbs (restrains) the torque fluctuations by means of a spring force, a hysteresis portion that absorbs (restrains) the torque fluctuations by means of a hysteresis torque generated by friction, and a limiter portion that generates slippage when torsion generated between a rotational shaft of the engine and a rotational shaft (an input shaft) of the transmission may not be restrained by the damper portion and the hysteresis portion.

In the limiter portion of the known torque fluctuation absorber disclosed, for example, in JP2005-127507A (which will be hereinafter referred to as Reference 1), friction members fixed to both surfaces of a disc are sandwiched between first and second frictional surface plates. The second frictional surface plate is configured so as not to rotate relative to the first frictional surface plate and so as to move in an axial direction of the input shaft of the transmission. The second frictional surface plate is biased by a disc spring toward the friction members. The disc spring in the limiter portion has a continuous annular shape. An outer circumferential end of the disc spring is supported by a holding plate while an inner circumferential end of the disc spring is in contact with the second frictional surface plate. Thus, the disc spring is assembled on the known torque fluctuation absorber while being inclined from the outer circumferential end to the inner circumferential end.

In addition, in a thrust portion (corresponding to the hysteresis portion) of the known torque fluctuation absorber disclosed in Reference 1, a flange portion of the hub is arranged between first and second side plates fixed to the disc. A first thrust member is arranged between the first side plate and the flange portion. A disc spring and a second thrust member are arranged between the second side plate and the flange portion. The second thrust member is biased by the disc spring. The disc spring in the hysteresis portion has a continuous annular shape. An outer circumferential end of the disc spring is supported by the second side plate while an inner circumferential end of the disc spring is in contact with the second thrust member. Thus, the disc spring is assembled on the known torque fluctuation absorber while being inclined from the outer circumferential end to the inner circumferential end.

Here, lifetimes of the limiter portion and the hysteresis portion may not depend on a thickness of each of the friction members but on a wear allowance of the friction member (i.e., the lifetimes of the limiter portion and the hysteresis portion are determined by a range where the disc spring may apply a load equal to or greater than a load required for biasing the friction member). The wear allowance is determined by a load of the disc spring. According to the known torque fluctuation absorber disclosed in Reference 1, the wear allowance of the friction member may not be increased due to the configuration of each of the limiter portion and the hysteresis portion. According to the configuration of each of the limiter portion and the hysteresis portion in Reference 1, the disc spring is sandwiched between two members. In addition, for example, when the disc spring is assembled on the known torque fluctuation absorber while being not inclined from the outer circumferential end to the inner circumferential end (i.e. in a state where the inner circumferential end is linear to the outer circumferential end in a direction perpendicular to the axial direction) or when the disc spring is assembled on the known torque fluctuation absorber substantially in the aforementioned condition, the spring may be brought into a firm contact with the two members. Therefore, the disc spring is consistently utilized only in a position obtained before the disc spring is flexibly deformed and compressed into a linear shape in the direction perpendicular to the axial direction. As a result, the lifetimes of the limiter portion and the hysteresis portion may shorten.

A need thus exists for a torque fluctuation absorber, which is not susceptible to the drawback mentioned above.

SUMMARY

According to an aspect of this disclosure, a torque fluctuation absorber includes a first annular member, a second annular member arranged to be axially separated from the first annular member, an annular and dish-shaped first disc spring arranged between the first annular member and the second annular member, a first support portion arranged between the first annular member and the first disc spring and being partially or continuously in contact with the first disc spring on a circle passing through a first predetermined radial portion of the first annular member, and a second support portion arranged between the second annular member and the first disc spring and being partially or continuously in contact with the first disc spring on a circle passing through a second predetermined radial portion of the second annular member, the second predetermined radial portion being radially different from the first predetermined radial portion of the first annular member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 2:
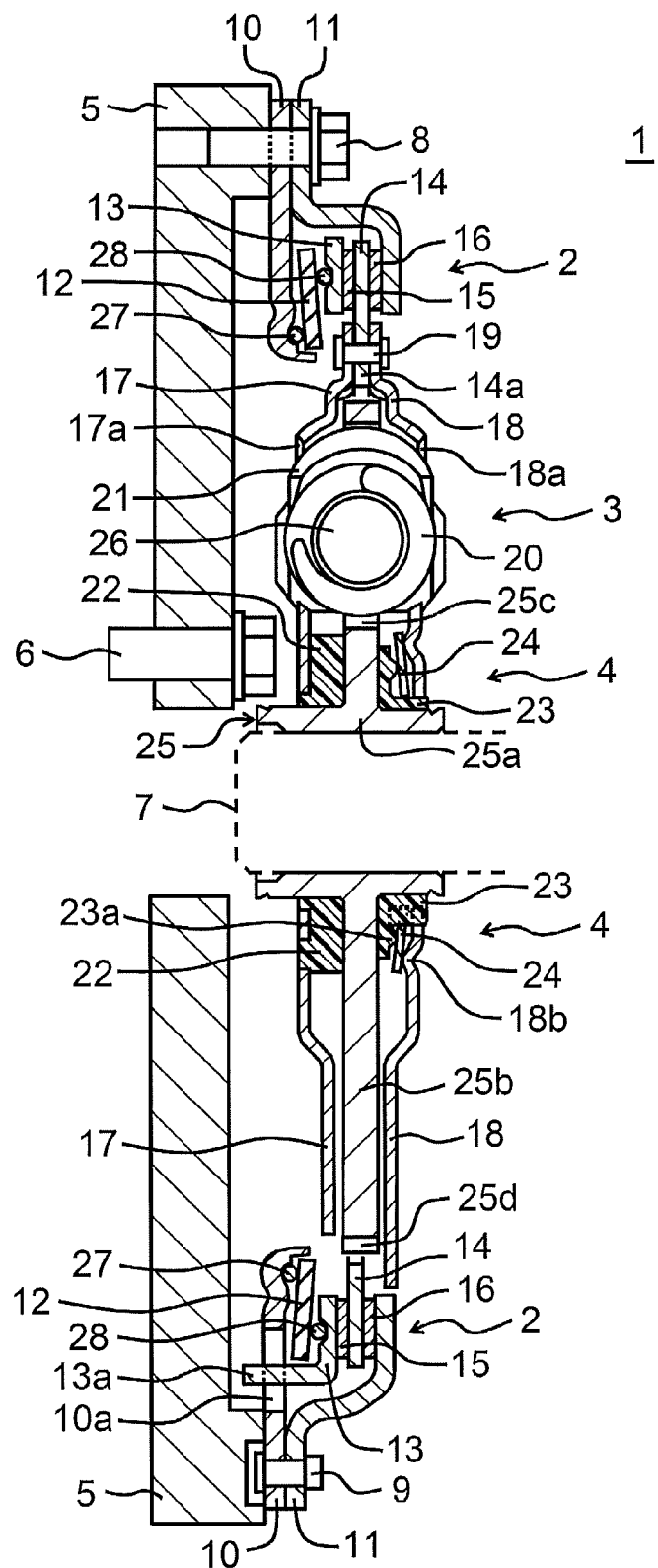
FIG. 2 is a cross-sectional view taken along the line II-II in FIG. 1.

A torque fluctuation absorber of this disclosure includes a first annular member 10 or 18 (in FIG. 2), a second annular member 13 or 23 (in FIG. 2), a disc spring 12 or 24 (in FIG. 2), a first support portion 27 or 18b (in FIG. 2), and a second support portion 28 or 23a (in FIG. 2). As illustrated in FIG. 2, the second annular member 13 or 23 is axially separated from the first annular member 10 or 18. The annular and dish-shaped disc spring 12 or 24 is arranged between the first annular member 10 and the second annular member 13 or between the first annular member 18 and the second annular member 23. The first support portion 27 or 18b is arranged between the first annular member 10 and the disc spring 12 or between the first annular member 18 and the disc spring 24. The first support portion 27 or 18b is partially or continuously in contact with the disc spring 12 or 24 on a circle passing through a predetermined radial portion (serving as a first predetermined radial portion) of the first annular member 10 or 18. The second support portion 28 or 23a is arranged between the second annular member 13 and the disc spring 12 or between the second annular member 23 and the disc spring 24. The second support portion 28 or 23a is partially or continuously in contact with the disc spring 12 or 24 and is located on a circle passing through a predetermined radial portion (serving as a second predetermined radial portion) of the second annular member 13 or 23. The predetermined radial portion of the second annular member 13 or 23 is arranged at a radially different position from the predetermined radial portion of the first annular member 10 or 18.

Reference numbers shown in the drawings will be hereinafter mentioned in following embodiments of the disclosure not in order to limit the embodiments but in order to allow technical matters in the embodiments to be easily understood.

Figure 1:
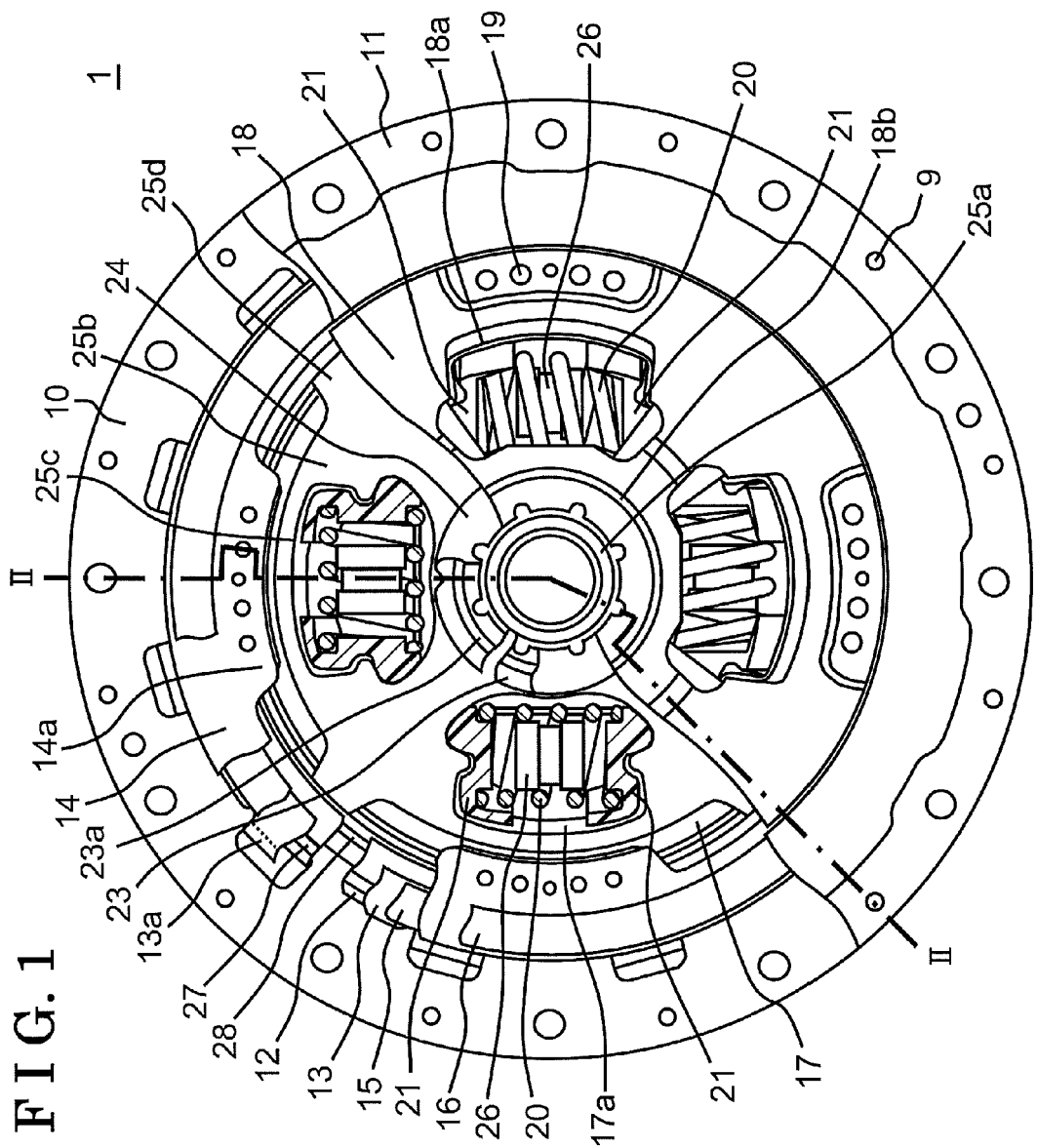
FIG. 1 is a plan view schematically illustrating a configuration of a torque fluctuation absorber according to a first embodiment disclosed here.
Figure 3:
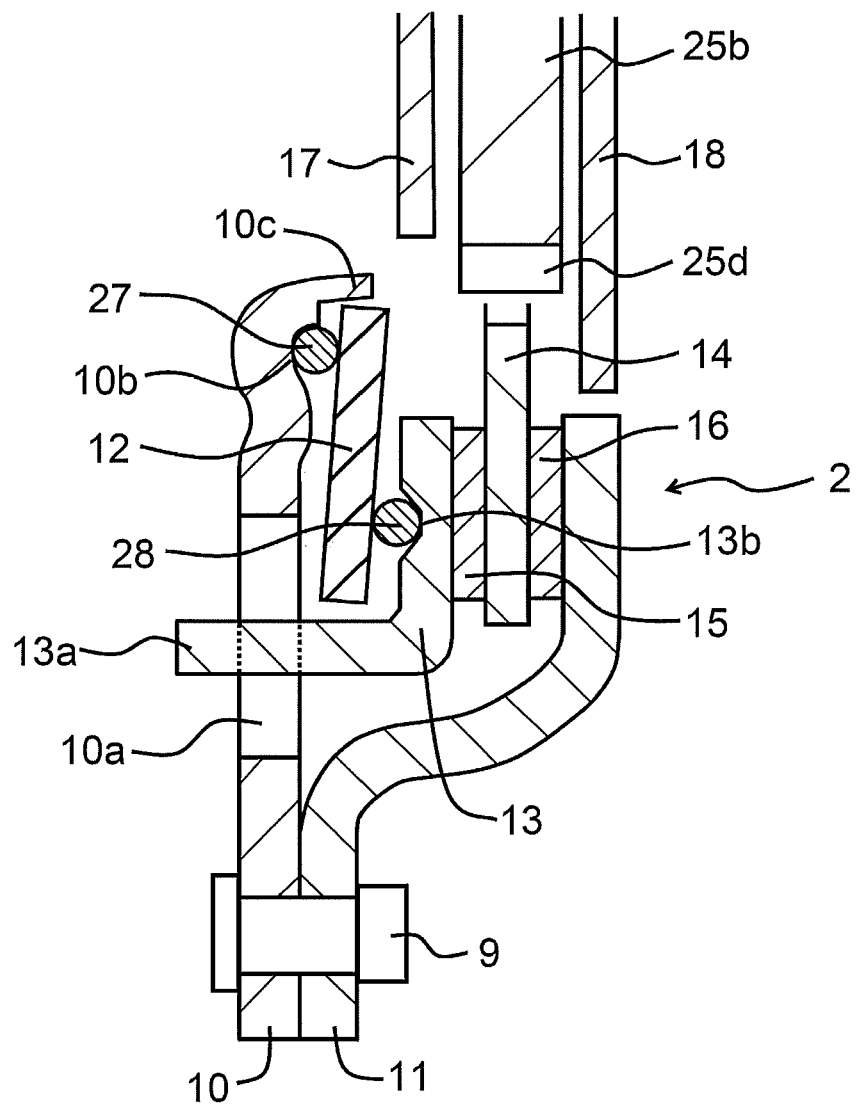
FIG. 3 is an enlarged sectional view schematically illustrating a configuration of a limiter portion of the torque fluctuation absorber according to the first embodiment disclosed here, when a disc spring is arranged at the limiter portion.
Figure 4:
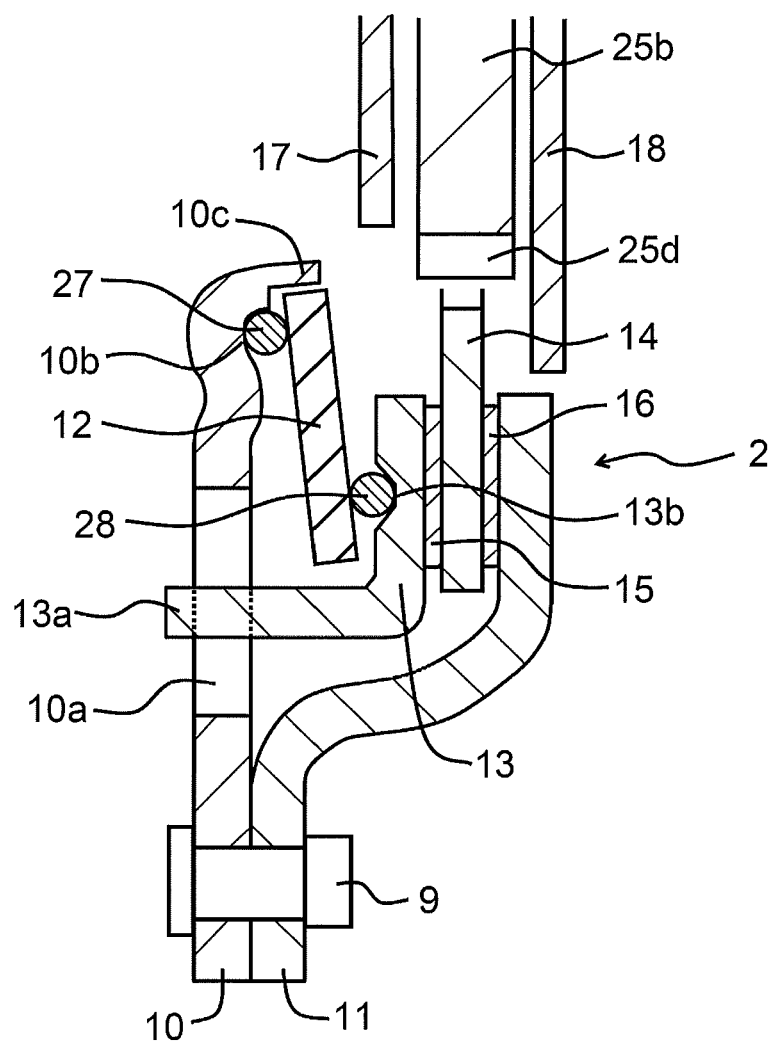
FIG. 4 is an enlarged sectional view schematically illustrating the configuration of the limiter portion of the torque fluctuation absorber according to the first embodiment disclosed here, when friction members in the limiter portion are worn.
Figure 5:
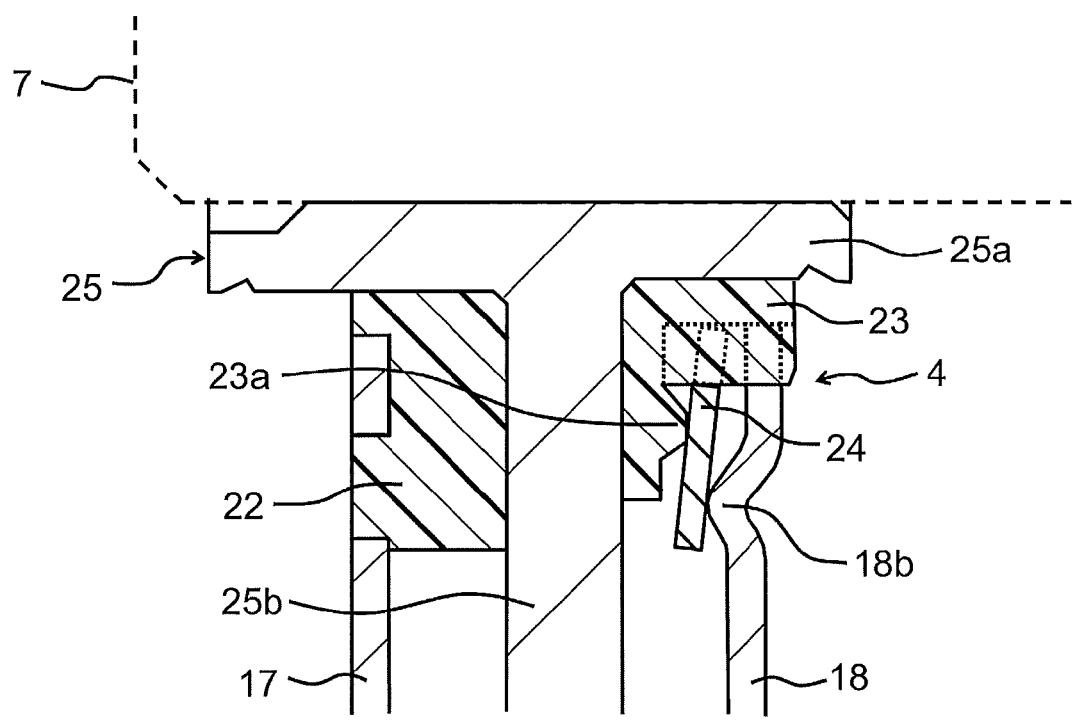
FIG. 5 is an enlarged sectional view schematically illustrating a configuration of a hysteresis portion of the torque fluctuation absorber according to the first embodiment disclosed here.

A torque fluctuation absorber 1 according to a first embodiment of the disclosure will be described as follows with reference to the illustrations of FIGS. 1 to 5. FIG. 1 is a plan view schematically illustrating a configuration of the torque fluctuation absorber 1 according to the first embodiment. FIG. 2 is a cross-sectional view taken along the line II-II in FIG. 1. FIG. 3 is an enlarged sectional view schematically illustrating a configuration of a limiter portion 2 of the torque fluctuation absorber 1 according to the first embodiment when the disc spring 12 serving as a first disc spring is attached to or arranged at the limiter portion 2. FIG. 4 is an enlarged sectional view schematically illustrating the configuration of the limiter portion 2 of the torque fluctuation absorber 1 according to the first embodiment when first and second friction members 15 and 16 (friction members) in the limiter portion 2 are worn. FIG. 5 is an enlarged sectional view schematically illustrating a configuration of a hysteresis portion 4 of the torque fluctuation absorber 1 according to the first embodiment.

The torque fluctuation absorber 1 according to the first embodiment is provided, for example, on a drivetrain between a crankshaft (an output shaft corresponding to a rotational shaft) of an engine (an internal combustion engine) and an input shaft 7 (corresponding to a rotational shaft) of a transmission. The torque fluctuation absorber 1 absorbs (restrains) torque fluctuations caused by torsion between the rotational shafts (between the crankshaft and the input shaft 7). As illustrated in FIG. 2, the torque fluctuation absorber 1 includes a damper portion 3, the hysteresis portion 4, and the limiter portion 2. The damper portion 3 has a torsion buffering function to absorb the torque fluctuations generated between the rotational shafts, by means of a spring force. The hysteresis portion 4 absorbs (restrains) the torque fluctuations by means of a hysteresis torque generated by friction or the like. In a case where the torque fluctuations are beyond the absorption capabilities of the damper portion 3 and the hysteresis portion 4, the limiter portion 2 generates slippage when torque of the engine is larger than a predetermined torque. The damper portion 3 is arranged in parallel with the hysteresis portion 4 on the drivetrain. The limiter portion 2 is arranged in series with the damper portion 3 and the hysteresis portion 4.

As illustrated in FIG. 2, the torque fluctuation absorber 1 further includes rivets 9, a support plate 10 serving as the first annular member, a cover plate 11, the disc spring 12 serving as the first disc spring, a pressure plate 13 serving as the second annular member, a lining plate 14, the first friction member 15 (friction member), the second friction member 16 (friction member), a first side plate 17, a second side plate 18 serving as the first annular member, rivets 19, coil springs 20, seat members 21, a first thrust member 22, a second thrust member 23 serving as the second annular member, the disc spring 24 serving as the first disc spring, a hub member 25, cushion members 26, and a first support member 27 serving as the first support portion, and a second support member 28 serving as the second support portion.

Each of the rivets 9 is a connecting member to integrally connect the support plate 10 to the cover plate 11.

The support plate 10 (the first annular member) having an annular shape supports an inner circumferential portion of the disc spring 12 by the first support member 27 (the support plate 10 may support an outer circumferential portion of the disc spring 12). The support plate 10 is a component of the limiter portion 2. An outer circumferential portion of the support plate 10 is integrally fixed to an outer circumferential portion of the cover plate 11 by the rivets 9 in an overlapping manner. The support plate 10 and the cover plate 11 are attached and fixed to a flywheel 5 by a bolt 8 (see FIG. 2). In addition, the flywheel 5 is connected to the crankshaft of the engine by a bolt 6 (see FIG. 2). The support plate 10 integrally rotates with the cover plate 11. An inner circumferential portion of the support plate 10 is positioned away from the cover plate 11 in an axial direction of the input shaft 7. As illustrated in FIG. 3, the support plate 10 has a bore portion 10a for supporting the pressure plate 13 so that support plate 10 may not rotate and so that the support plate 10 may move in the axial direction. A convex portion 13a of the pressure plate 13 is inserted in the bore portion 10a so as not to rotate and so as to move in the axial direction. The support plate 10 includes a holding portion 10b recessed toward the engine. The first support member 27 (the first support portion) having an annular shape is supported by the holding portion 10b positioned at a radially inward side of the bore portion 10a. The support plate 10 further includes a guide portion 10c positioned at a radially inward side of the disc spring 12. The guide portion 10c is positioned at a radially inward side of the disc spring 12 so as to restrict a radial movement of the disc spring 12, thereby determining a radial position of the disc spring 12 in the limiter portion 2. In addition, the disc spring 12 is refrained by the guide portion 10c from being detached from the limiter portion 2. In order to increase strength and rigidity of the guide portion 100, the guide portion 10c is continuously formed at the support plate 10 along a circumferential direction of the support plate 10 so as to have an annular rib shape. The guide portion 10G has a surface facing the disc spring 12. At least a portion of the surface of the guide portion 10c is formed into a tapered shape (an inclined surface) in order to allow the disc spring 12 to be flexibly deformed.

As illustrated in FIG. 3, the cover plate 11 is an annular member to cover the limiter portion 2. The cover plate 11 is a component of the limiter portion 2. The outer circumferential portion of the cover plate 11 is integrally fixed to the outer circumferential portion of the support plate 10 by the rivets 9 in an overlapping manner. The cover plate 11 and the support plate 10 are attached and fixed to the flywheel 5 by the bolt 8. An inner circumferential portion of the cover plate 11 is positioned away from the support plate 10 in the axial direction. The inner circumferential portion of the cover plate 11 is slidably in a firm contact with the second friction member 16.

As illustrated in FIG. 2, the disc spring 12 arranged between the support plate 10 and the pressure plate 13 corresponds to an annular and disc-shaped spring. The disc spring 12 serving as the first disc spring is a component of the limiter portion 2. The disc spring 12 includes first and second surfaces facing the engine and the transmission, respectively (the first and second surfaces face the left and right sides in FIG. 3). The inner circumferential portion of the first surface of the disc spring 12 is supported via the first support member 27 having the annular shape, by the support plate 10. The pressure plate 13 is biased toward the cover plate 11 via the second support member 28 having an annular shape, by the outer circumferential portion of the second surface (facing the transmission, i.e. the right side in FIG. 3) of the disc spring 12. The outer circumferential portion of the second surface of the disc spring 12 is positioned at a radially outward side of the first support member 27. In a condition where the disc spring 12 is in an unloaded state, the disc spring 12 is arranged in a state where an inner circumferential end is inclined toward the engine (toward a first side in the torque fluctuation absorber 1, i.e. toward the left side in FIG. 3) relative to an outer circumferential end. For example, when attaching the disc spring 12 to the torque fluctuation absorber 1, the inner circumferential end is shifted beyond a linear state relative to the outer circumferential end in a direction perpendicular to the axial direction and is thereafter inclined toward the transmission (toward a second side of the torque fluctuation absorber 1, i.e. toward the right side in FIG. 3) relative to the outer circumferential end (i.e., the disc spring 12 has a substantially linear shape in the direction perpendicular to the axial direction in a state where the inner circumferential end is in the linear state relative to the outer circumferential end). As a result, when the disc sprig 12 is attached to the torque fluctuation absorber 1, the disc spring 12 is assembled on the torque fluctuation absorber 1 in a state where the inner circumferential end is inclined toward the transmission relative to the outer circumferential end. As the first friction member 15 and the second friction member 16 wear, the inner circumferential end is shifted beyond the linear state relative to the outer circumferential end to be inclined toward the engine (toward the left side in FIG. 4) relative to the outer circumferential end. In other words, according to the first embodiment, the disc spring 12 may be flexibly deformed beyond the linear shape and compressed by the first support member 27 and the second support member 28, therefore being assembled on the torque fluctuation absorber 1.

As illustrated in FIG. 3, the pressure plate 13 (the second annular member) having an annular shape is arranged between the disc spring 12 and the first friction member 15. The pressure plate 13 is a component of the limiter portion 2. The pressure plate 13 includes the convex portion 13a by which the pressure plate 13 is supported so as to not rotate relative to the support plate 10 and so as to move in the axial direction. The convex portion 13a having an annular rib shape extending continuously circumferentially is inserted in the bore portion 10a of the support plate 10 so as not to rotate and so as to move in the axial direction. The pressure plate 13 includes a surface facing the disc spring 12 and a holding portion 13b recessed in the surface toward the first friction member 15 (toward the right side in FIG. 3). The second support member 28 is held by the holding portion 13b. The pressure plate 13 is biased via the second support member 28 by the disc spring 12 toward the first friction member 15. The pressure plate 13 is slidably in a firm contact with the first friction member 15. The first friction member 15 and the second friction member 16 wear; therefore, the pressure plate 13 shifts in a direction in which the pressure plate 13 separates from the support plate 10.

The lining plate 14 is an annular member arranged between the first friction member 15 and the second friction member 16 that are arranged between the cover plate 11 and the pressure plate 13. The lining plate 14 is a component of the limiter portion 2. As illustrated in FIG. 1, the lining plate 14 includes multiple stopper portions 14a. The multiple stopper portions 14a are arranged at an inner circumferential portion of the lining plate 14 so as to extend radially inwardly. The stopper portions 14a are positioned at predetermined intervals from one another in a circumferential direction of the lining plate 14 so as to restrain the torsion at the damper 3 within a predetermined angle. In particular, in a case where the torsion is generated at the damper 3, the stopper portions 14a make contact with stopper portions 25d of the hub member 25, thereby absorbing the torsion. The stopper portions 14a are sandwiched between the first side plate 17 and the second side plate 18 and are integrally fixed thereto by the rivets 19. An outer circumferential portion of the lining plate 14 is arranged between the first friction member 15 and the second friction member 16. The first friction member 15 and the second friction member 16 are held by the outer circumferential portion of the lining plate 14 so as to be fixed thereto by adhesive, rivets, or the like.

The first friction member 15 is a component of the limiter portion 2. As illustrated in FIG. 2, the first friction member 15 having an annular shape is arranged between the lining plate 14 and the pressure plate 13. The first friction member 15 is held by the lining plate 14 and is slidably in a firm contact with the pressure plate 13. Rubber, resin, (short or long) fiber material, or the like that includes particles for adjusting a frictional coefficient μ may be applied as the first friction member 15.

The second friction member 16 is a component of the limiter portion 2. As illustrated in FIG. 2, the second friction member 16 having an annular shape is arranged between the lining plate 14 and the cover plate 11. The second friction member 16 is held by the lining plate 14 and is slidably in a firm contact with the cover plate 11. The rubber, resin, (short or long) fiber material, or the like that includes particles for adjusting a frictional coefficient μ may be applied as the second friction member 16.

The first side plate 17 is an annular member arranged at a flange portion 25b of the hub member 25 so as to face a first surface of the flange portion 25b. The first surface of the flange portion 25b faces the engine (the left side in FIG. 2). The first side plate 17 is a component of each of the damper portion 3 and the hysteresis portion 4. The first side plate 17 has a portion located close to an outer circumferential end (the portion will be hereinafter referred to as an outer circumferential end portion). The outer circumferential end portion of the first side plate 17 is integrally fixed to the lining plate 14 and the second side plate 18 by the rivets 19. Opening portions 17a are formed in the first side plate 17 so as to be positioned radially at an intermediate portion of the damper portion 3. The coil spring 20 and a pair of seat members 21 are accommodated in each of the opening portions 17a. Both end surfaces of the opening portion 17a in a circumferential direction of the first side plate 17 are contactable with and separable from the pair of seat members 21. The first side plate 17 is engaged with the first thrust member 22 in the hysteresis portion 4, which is positioned at a radially inward side of the damper portion 3, so that the first thrust member 22 is movable in the axial direction and so that the first thrust member 22 is not rotatable relative to the first side plate 17. An inner circumferential end of the first side plate 17 is supported via the first thrust member 22 by a hub portion 25a of the hub member 25 so that the first side plate 17 is rotatable.

As illustrated in FIG. 1, the second side plate 18 serving as the first annular member is an annular member arranged at the flange portion 25b of the hub member 25 so as to face a second surface of the flange portion 25b. The second surface of the flange portion 25b faces the transmission (the right side in FIG. 2). The second side plate 18 is a component of each of the damper portion 3 and the hysteresis portion 4. The second side plate 18 has a portion located close to an outer circumferential end (the portion will be hereinafter referred to as an outer circumferential end portion). The outer circumferential end portion of the second side plate 18 is integrally fixed to the lining plate 14 and the first side plate 17 by the rivets 19. Opening portions 18a are formed in the second side plate 18 so as to be positioned radially at the intermediate portion of the damper portion 3. The coil spring 20 and the pair of seat members 21 are accommodated in each of the opening portions 18a. Both end surfaces of the opening portion 18a in a circumferential direction of the second side plate 18 are contactable with and separable from the pair of seat members 21. As Illustrated in FIG. 5, the second side plate 18 includes a support portion 18b serving as the first support portion. The support portion 18b protruding toward the disc spring 24 having first and second surfaces facing the engine and the transmission, respectively, is provided in the hysteresis portion 4 positioned at the radially inward side of the damper portion 3. The support portion 18b may be formed when the second side plate 18 is manufactured by press working. The support portion 18b protrudes toward the disc spring 24 continuously (or partially) along the circumferential direction of the second side plate 18. The support portion 18b is arranged at a radially outward side of the support portion 23a (second support portion) of the second thrust member 23. The support portion 18b serves as a radially outward support point that is in contact with an outer circumferential portion of the second surface (facing the right side in FIG. 5) of the disc spring 24. The second side plate 18 is engaged with the second thrust member 23 so as not to rotate thereto and so as to move in the axial direction. An inner circumferential portion of the second side plate 18 is supported via the second thrust member 23 by the hub portion 25a of the hub member 25 so that the second side plate 18 is rotatable.

Each of the rivets 19 is a fixing member to integrally fix the lining plate 14, the first side plate 17, and the second side plate 18 to one another.

The coil spring 20 is a component of the damper portion 3. The coil spring 20 is accommodated in the opening portion 17a formed in the first side plate 17, the opening portion 18a formed in the second side plate 18, and a opening portion 25c formed in the flange portion 25b of the hub member 25 (the multiple opening portions 25c are circumferentially formed in the flange portion 25b). The coil spring 20 is in contact with the pair of seat members 21 circumferentially arranged at both ends of each of the opening portion 17a, the opening portion 18a, and the opening portion 25c. The coil springs 20 are compressed when the first side plate 17 and the second side plate 18 rotate relative to the hub member 25, thereby absorbing a shock due to a rotational difference among the first side plate 17, the second side plate 18, and the hub member 25. Each of the coil springs 20 may have a straight shape. Alternatively, a spring having a straight shape is bent and may be thereby utilized as the coil spring 20. An arc spring circumferentially curved may be utilized as the coil spring 20 in order to allow the large torsion between the crankshaft and the input shaft 7.

As illustrated in FIG. 1, the pair of seat members 21 each serving as a component of the damper portion 3 is accommodated in the opening portion 17a formed in the first side plate 17, the opening portion 18a formed in the second side plate 18, and the opening portion 25c formed in the hub member 25 (the flange portion 25b). The pair of seat members 21 is circumferentially arranged between both ends of the coil spring 20 and the end surfaces of the opening portion 17a, between the ends of the coil spring 20 and the end surfaces of the opening portion 18a, and between the ends of the coil spring 20 and both end surfaces of the opening portion 25c in the circumferential direction of each of the opening portions 17a, 18a, and 25c. The seat member 21 may be made of resin in order to reduce abrasion of the coil spring 20.

The first thrust member 22 is a component of the hysteresis portion 4 and is an annular member arranged between the first side plate 17 and the hub member 25 (see FIG. 2). The first thrust member 22 is positioned between the first side plate 17 and the flange portion 25b in the axial direction. The first thrust member 22 is engaged with the first side plate 17 so as not to rotate relative thereto and so as to move in the axial direction. The first thrust member 22 is slidably in a firm contact with the flange portion 25b. The first thrust member 22 radially positioned between the first side plate 17 and the hub portion 25a serves as a slide bearing (bush) via which the first side plate 17 is rotatably supported by the hub portion 25a.

The second thrust member 23 (the second annular member) having an annular shape is a component of the hysteresis portion 4 and is arranged between the second side plate 18 and the hub member 25 (see FIG. 2). The second thrust member 23 is positioned between the disc spring 24 and the flange portion 25b in the axial direction. The second thrust member 23 includes the support portion 23a serving as the second support portion and protruding toward the disc spring 24 continuously (or partially) in a circumferential direction of the second thrust member 23. The support portion 23a is arranged at a radially inward side of the support portion 18b of the second side plate 18. In addition, the support portion 23a serves as a radially inward support point that is in contact with an inner circumferential portion of the first surface (facing the left side in FIG. 5) of the disc spring 24. The support portion 23a is biased by the disc spring 24 toward the flange portion 25b. The second thrust member 23 is slidably in a firm contact with the flange portion 25b. The second thrust member 23 is engaged with the second side plate 18 so as not to rotate relative thereto and so as to move in the axial direction. The second thrust member 23 radially positioned between the second side plate 18 and the hub portion 25a serves as a slide bearing (bush) via which the second side plate 18 is rotatably supported by the hub portion 25a. A thrust member formed by resin may be utilized as the second thrust member 23 for cost reduction. The second thrust member 23 wears, thereby being deformed in a direction in which the second thrust member 23 separates from the second side plate 18.

The disc spring 24 serving as the first disc spring is a component of the hysteresis portion 4. As illustrated in FIG. 2, the disc spring 24 is arranged between the second thrust member 23 and the second side plate 18. The disc spring 24 corresponding to an annular and dish-shaped spring biases the second thrust member 23 toward the flange portion 25b. An inner circumferential end of the disc spring 24 is engaged with the second thrust member 23 so that the disc spring 24 may not rotate relative to the second thrust member 23 and so that the disc spring 24 may move in the axial direction. The outer circumferential portion of the second surface (facing the transmission, i.e. the right side in FIG. 5) of the disc spring 24 is supported by the support portion 18b of the second side plate 18. The support portion 23a of the second thrust member 23 is biased toward the flange portion 25b by the inner circumferential portion of the first surface (facing the engine, i.e. the left side in FIG. 5) of the disc spring 24. The inner circumferential portion of the first surface of the disc spring 24 is located at the radially inward side of the support portion 18b. In a condition where the disc spring 24 is in an unloaded state, the disc spring 24 is arranged in a state where an inner circumferential end is inclined toward the engine (toward the first side in the torque fluctuation absorber 1, i.e. toward the left side in FIG. 5) relative to an outer circumferential end. For example, when attaching the disc spring 24 to the torque fluctuation absorber 1, the inner circumferential end is shifted beyond a linear state relative to the outer circumferential end and is thereafter inclined toward the transmission (toward the second side of the torque fluctuation absorber 1, i.e. toward the right side in FIG. 5) relative to the outer circumferential end (i.e., the disc spring 24 has a linear shape in the direction perpendicular to the axial direction in a state where the inner circumferential end is in the linear state relative to the outer circumferential end). As a result, when the disc spring 24 is attached to the torque fluctuation absorber 1, the disc spring 24 is assembled on the torque fluctuation absorber 1 in a state where the inner circumferential end is inclined toward the transmission relative to the outer circumferential end. As the first thrust member 22 and the second thrust member 23 wear, the inner circumferential end is shifted beyond the linear state relative to the outer circumferential end to be inclined toward the engine (toward the left side in FIG. 5) relative to the outer circumferential end. In other words, the disc spring 24 may be flexibly deformed beyond the linear shape and compressed by the support portion 18b and the support portion 23a, therefore being assembled on the torque fluctuation absorber 1.

The hub member 25 outputting a rotational driving force from the damper 3 and the hysteresis portion 4 to the transmission is a component of each of the damper portion 3 and the hysteresis portion 4. The hub member 25 includes the hub portion 25a and the flange portion 25b. The flange portion 25b extends radially outwardly from a predetermined portion of an outer circumferential portion of the hub portion 25a. As illustrated in FIG. 2, an inner circumferential surface of the hub portion 25a is splined to the input shaft 7 of the transmission so as not to rotate and so as to move in the axial direction. The first side plate 17 is rotatably supported via the first thrust member 22 by the outer circumferential portion of the hub portion 25a. The second side plate 18 is rotatably supported via the second thrust member 23 by the outer circumferential portion of the hub portion 25a. The flange portion 25b includes the opening portions 25c in the damper portion 3. The coil spring 20 and the pair of seat members 21 are accommodated in each of the opening portions 26c. The end surfaces of the opening portion 25c in the circumferential direction of the opening portion 25c are contactable with and separable from the pair of seat members 21. The flange portion 25b is arranged between the first thrust member 22 and the second thrust member 23 so as to be slidably supported by axial surfaces of the hysteresis portion 4 located at the radially inward side of the damper portion 3. The flange portion 25b includes the multiple stopper portions 25d protruding radially outwardly from an outer circumferential end of the flange portion 25b. The stopper portions 25d restrict the torsion of the damper portion 3 within a predetermined angle. When the torsion is generated at the damper portion 3, the stopper portions 14a of the lining plate 14 make contact with the stopper portions 25d of the hub member 25; thereby, the torsion generated at the damper portion 3 is restrained.

The cushion members 26 absorb a shock generated when the stopper portions 25d of the hub member 25 make contact with the stopper portions 14a of the lining plate 14 when the torsion is generated at the damper portion 3. Each of the cushion members 26 is arranged within the coil spring 20. When the torsion is generated at the damper portion 3, the cushion member 26 remains in an unloaded state until the cushion member 26 is sandwiched by the pair of seat members 21 therebetween. In particular, when the torsion is generated at the damper portion 3, the cushion member 26 is sandwiched by the pair of seat members 21 therebetween before the stopper portions 25d of the hub member 25 make contact with the stopper portions 14a of the lining plate 14.

The first support member 27 serving as the first support portion is a member formed by a round bar shaped into a circle. The first support member 27 is a component of the limiter portion 2. The first support member 27 is supported by the holding portion 10b of the support plate 10 (see FIG. 3). The first support member 27 is arranged at a radially inward side of the second support member 28. In addition, the first support member 27 serves as a radially inward support point that is in contact with the inner circumferential portion of the first surface (facing the engine that is to the left side in FIG. 3) of the disc spring 12.

The second support member 28 serving as the second support portion is a member formed by a round bar shaped into a circle. The second support member 28 is a component of the limiter portion 2. The second support member 28 is supported by the holding portion 13b of the pressure plate 13. The second support member 28 is positioned at the radially outward side of the first support member 27. In addition, the second support member 28 serves as a radially outward support point that is in contact with the outer circumferential portion of the second surface (facing the transmission that is to the right side in FIG. 3) of the disc spring 12.

Figure 6:
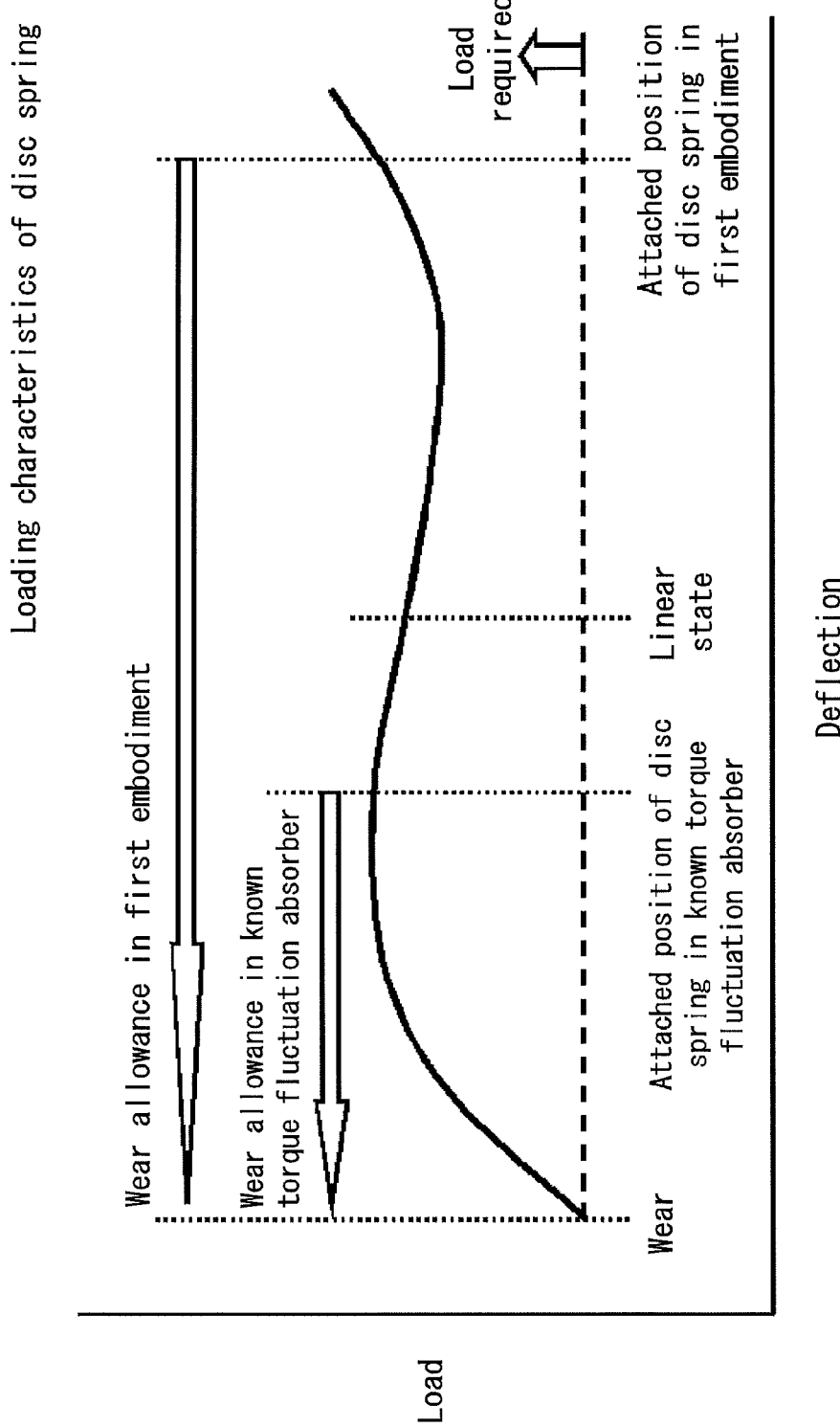
FIG. 6 is a graph showing a load/deflection curve of a disc spring according to the torque fluctuation absorber according to the first embodiment disclosed here.

Next, a wear allowance of each of the first friction member 15, the second friction member 16, and the second thrust member 23 will be described as follows with reference to FIG. 6. The wear allowance is determined by a load of each of the disc spring 12 and the disc spring 24. FIG. 6 shows a load/deflection curve (loading characteristics) of each of the disc spring 12 and the disc spring 24 in the torque fluctuation absorber 1. A lifetime of the limiter portion 2 or the hysteresis portion 4 depends on the wear allowance (i.e., the lifetime of the limiter portion 2 or the hysteresis portion 4 depends on a range where each of the disc spring 12 and the disc spring 24 may apply a load required for biasing each of the first friction member 15, the second friction member 16, and the second thrust member 23).

According to the torque fluctuation absorber 1 of the first embodiment, in a condition where each of the disc spring 12 (in FIG. 3) and the disc spring 24 (in FIG. 5) is in the unloaded state, each of the disc spring 12 and the disc spring 24 is positioned in a state where the inner circumferential end is not in the linear state relative to the outer circumferential end in the direction perpendicular to the axial direction. In particular, for example, the inner circumferential end is inclined toward the engine (toward the left side in each of FIGS. 3 and 5) relative to the outer circumferential end in a condition where each of the disc spring 12 and the disc spring 24 is in the unloaded state. Here, as each of the disc spring 12 and the disc spring 24 is flexibly curved or deformed in such a way that the inner circumferential end is inclined toward the transmission (toward the right side in FIG. 3 and FIG. 5) while the outer circumferential end is fixed, the inner circumferential end is shifted beyond the linear state relative to the outer circumferential end to be inclined toward the transmission relative to the outer circumferential end. As seen from FIG. 6, a known torque fluctuation absorber does not include the first and second support portions (the first support member 27 and the second support member 28 that are shown in FIG. 3, and the support portion 18b and the support portion 23a that are shown in FIG. 5) according to the first embodiment. Therefore, for example, in a condition where each of the disc spring 12 and the disc spring 24 is attached to the known torque fluctuation absorber, each of the disc spring 12 and the disc spring 24 is arranged in a state where the inner circumferential end is inclined toward the engine relative to the outer circumferential end rather than being positioned in the linear state relative to the outer circumferential end. As a result, according to the known torque fluctuation absorber, as seen in FIG. 6, the wear allowance is only in an area between "Wear" ("Load required") and "Linear state" (in which the inner circumferential end is in the linear state relative to the outer circumferential end in the direction perpendicular to the axial direction). On the other hand, according the first embodiment, the first support portion and the second support portion (the first support member 27 and the second support member 28 that are shown in FIG. 3, and the support portion 18b and the support portion 23a that are shown in FIG. 5) are provided in the torque fluctuation absorber 1. Therefore, in a condition where each of the disc spring 12 and the disc spring 24 is attached to the torque fluctuation absorber 1, the inner circumferential end is shifted beyond the linear state relative to the outer circumferential end to be inclined toward the transmission relative to the outer circumferential end. As a result, as seen in FIG. 6, the wear allowance ranges from "Wear" ("Load required") to an area where deflection of each of the disc spring 12 and the disc spring 24 is beyond "Linear state".

According to the torque fluctuation absorber 1 of the first embodiment, the first support member 27 and the second support member 28 that are in contact with the disc spring 12 of the limiter portion 2, may be provided radially in different positions from the support portion 18b and the support portion 23a that are in contact with the disc spring 24 of the hysteresis portion 4. Therefore, the disc spring 12 and the disc spring 24 may be flexibly curved so as to be shifted beyond the linear shape and is therefore assembled on the torque fluctuation absorber 1. Consequently, the wear allowance in the limiter portion 2 or the hysteresis portion 4 may be increased. As a result, a lifetime of the torque fluctuation absorber 1 may be refrained from shortening.

Figure 7:
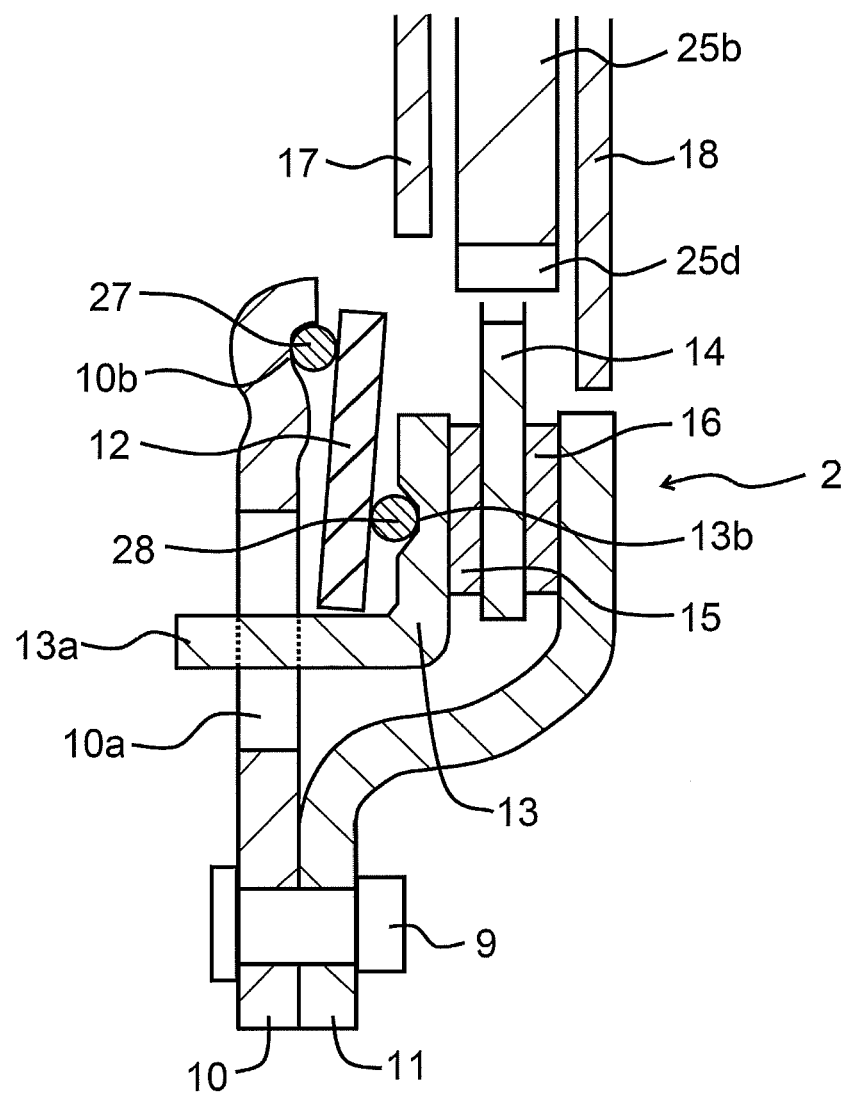
FIG. 7 is an enlarged sectional view schematically illustrating the configuration of the limiter portion of the torque fluctuation absorber according to a second embodiment disclosed here.

The torque fluctuation absorber 1 according to a second embodiment of the disclosure will be described as follows with reference to FIG. 7. FIG. 7 is an enlarged sectional view schematically illustrating the configuration of the limiter portion 2 of the torque fluctuation absorber 1 according to the second embodiment.

The second embodiment is a modified example of the first embodiment. According to the first embodiment, the guide portion 100 (see FIG. 3) is arranged at the support plate 10 in order to determine the radial position of the disc spring 12 in the limiter portion 2. Alternatively, according to the second embodiment, the convex portion 13a of the pressure plate 13 may serve as the guide portion for determining the radial position of the disc spring 12 in the limiter portion 2. Accordingly, according to the torque fluctuation absorber 1 of the second embodiment, the outer circumferential end of the disc spring 12 extends so as to be positioned close to the convex portion 13a of the pressure plate 13. The radial movement of the disc spring 12 is restricted by the convex portion 13a; thereby, the convex portion 13a determines the radial position of the disc spring 12 in the limiter portion 2. In addition, the disc spring 12 is refrained by the convex portion 13a from being detached from the limiter portion 2. Other configurations of the second embodiment are similar to those of the first embodiment.

The torque fluctuation absorber 1 according to the second embodiment has effects similar to those of the torque fluctuation absorber 1 according to the first embodiment.

Figure 8:
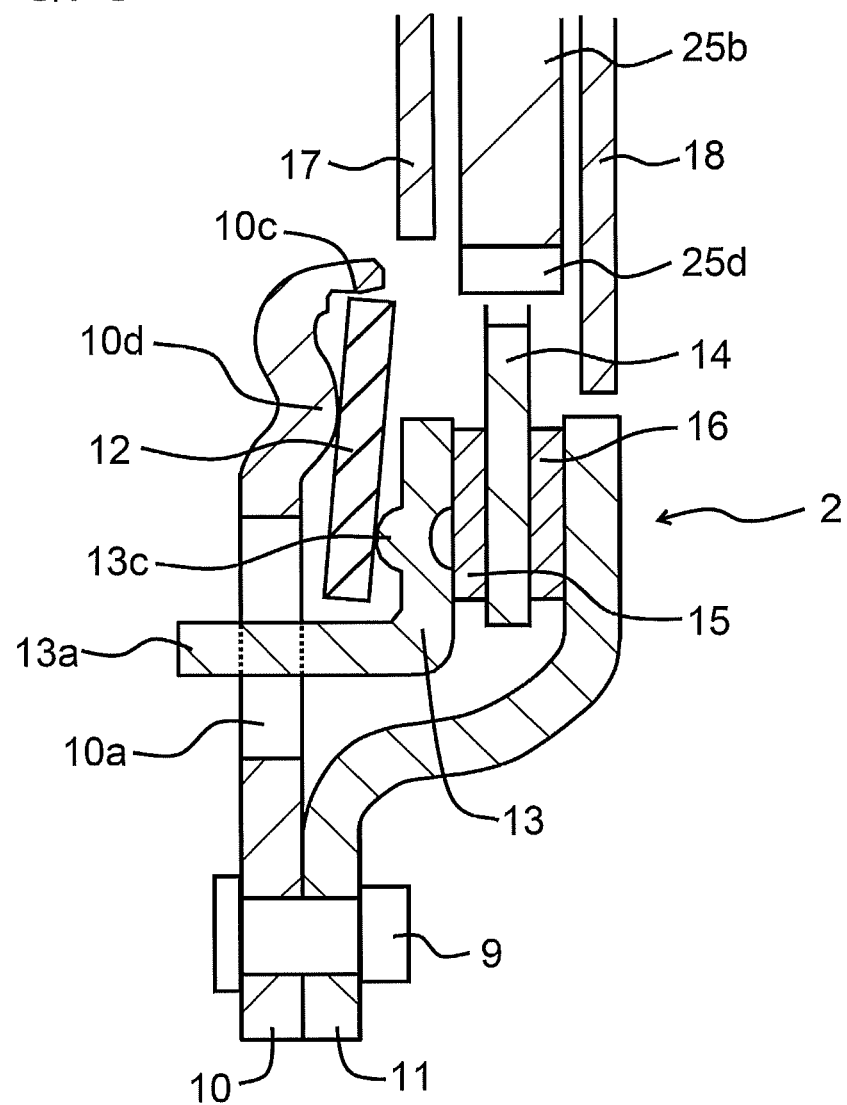
FIG. 8 is an enlarged sectional view schematically illustrating the configuration of the limiter portion of the torque fluctuation absorber according to a third embodiment disclosed here.

The torque fluctuation absorber 1 according to a third embodiment of the disclosure will be described as follows with reference to FIG. 8. FIG. 8 is an enlarged sectional view schematically illustrating the configuration of the limiter portion 2 of the torque fluctuation absorber 1 according to the third embodiment.

The third embodiment is another modified example of the first embodiment.

According to the torque fluctuation absorber 1 of the first embodiment, the first support member 27 and the second support member 28 serve as the radially inward support point and the radially outward support point, respectively, for supporting the disc spring 12 in the limiter portion 2 (see FIG. 3). Alternatively, according to the torque fluctuation absorber 1 of the third embodiment, as illustrated in FIG. 8, a support portion 10d having a convex portion protruding toward the disc spring 12 (toward the right side in FIG. 8) in the axial direction is arranged at the support plate 10. In addition, a support portion 13c having a convex portion protruding toward the disc spring 12 (toward the left side in FIG. 8) in the axial direction is arranged at the pressure plate 13. The support portion 10d (the first support portion) of the support plate 10 serves as the radially inward support point and the support portion 13c (the second support portion) of the pressure plate 13 serves as the radially outward support point. In addition, the position of the radially inward support point and the position of the radially outward support point may be radially reversed; thereby, the inclination of the disc spring 12 relative to the axial direction may be reversed (the position of the radially inward support point and the position of the radially outward support point may be radially reversed in other embodiments). The support portion 10d and the support portion 13c may be formed by pressing the support plate 10 and the pressure plate 13. The disc spring 12 may be flexibly deformed beyond the linear shape and compressed by the support portion 10d and the support portion 13c, thereby being assembled on the torque fluctuation absorber 1. Other configurations of the third embodiment are similar to those of the first embodiment.

The torque fluctuation absorber 1 according to the third embodiment has effects similar to those of the torque fluctuation absorber 1 according to the first embodiment.

Figure 9:
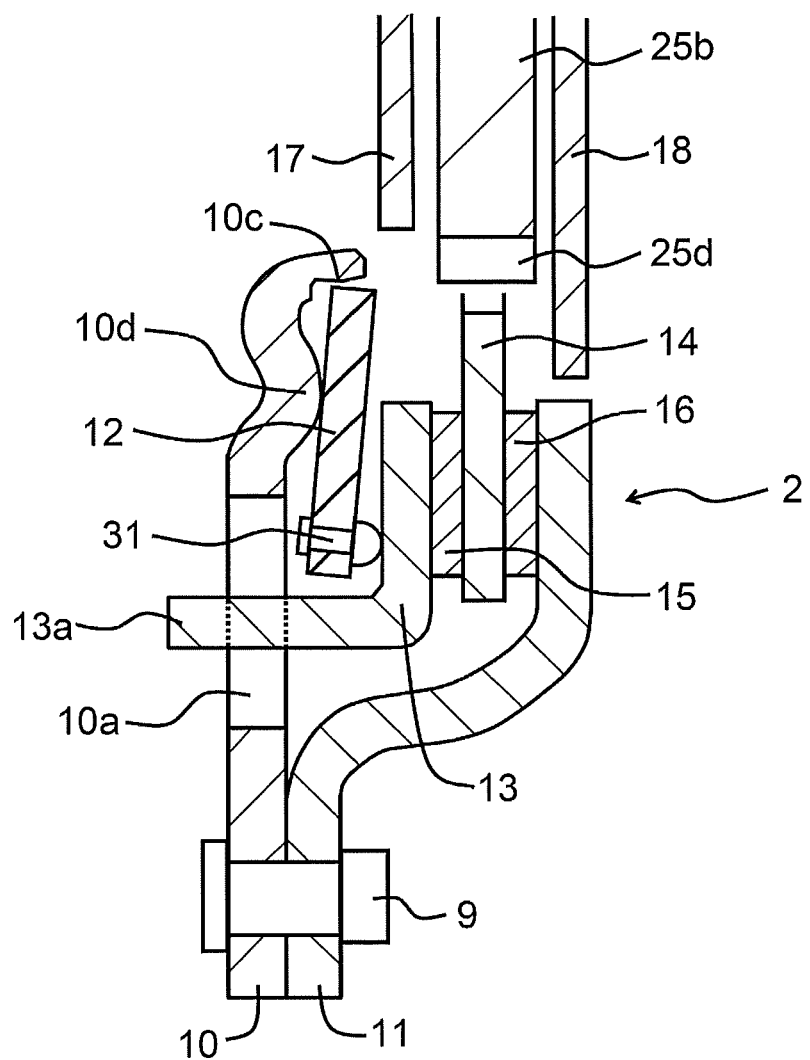
FIG. 9 is an enlarged sectional view schematically illustrating the configuration of the limiter portion of the torque fluctuation absorber according to a fourth embodiment disclosed here.
Figure 10:
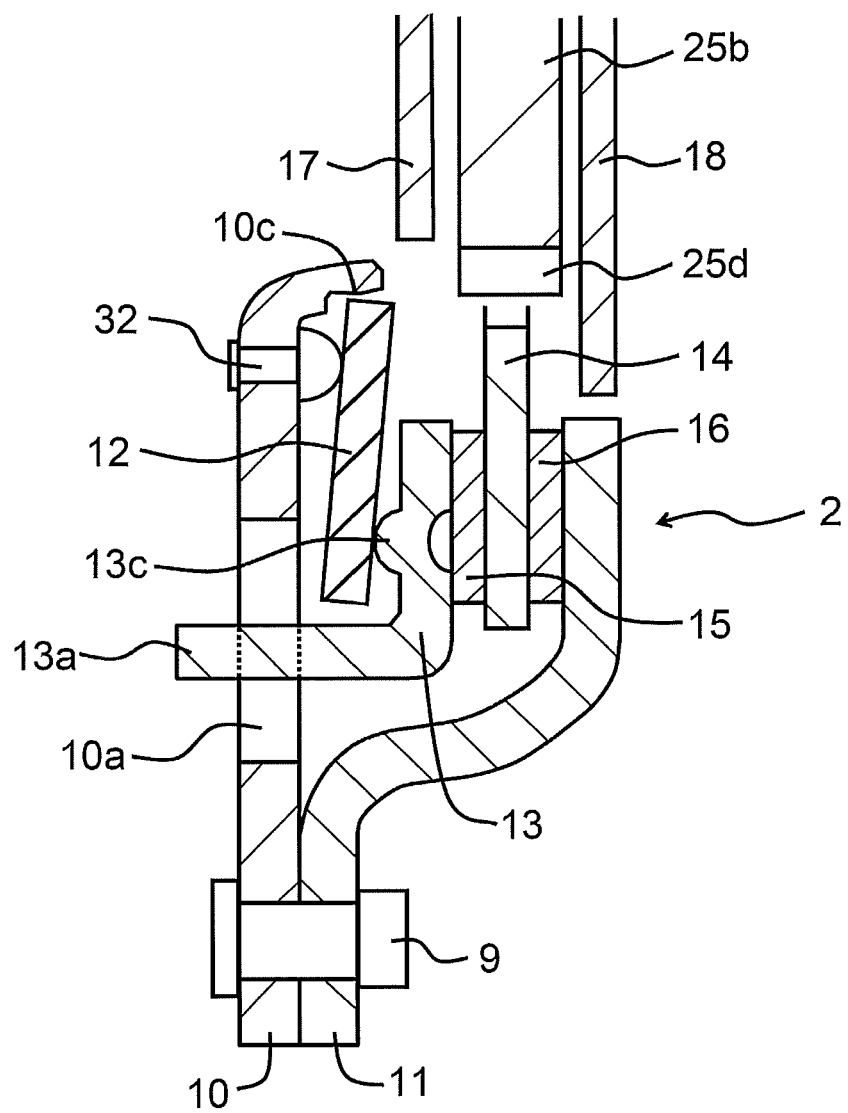
FIG. 10 is an enlarged sectional view schematically illustrating the configuration of the limiter portion of the torque fluctuation absorber according to a first modified example of the fourth embodiment disclosed here.
Figure 11:
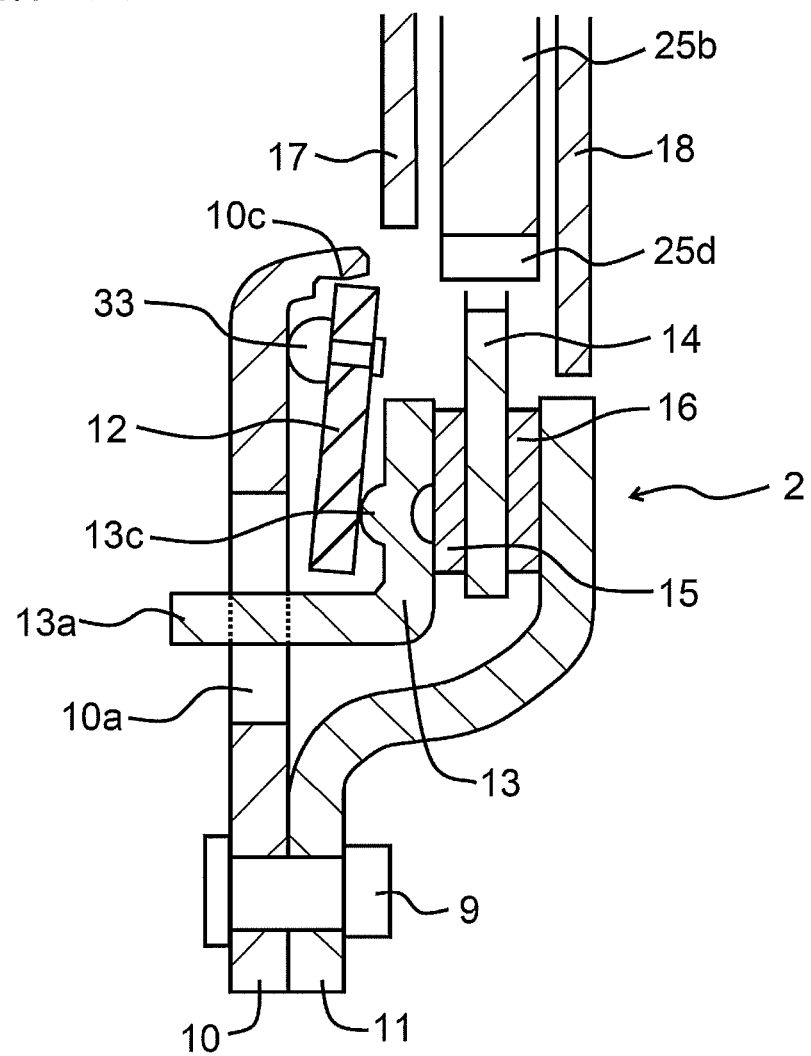
FIG. 11 is an enlarged sectional view schematically illustrating the configuration of the limiter portion of the torque fluctuation absorber according to a second modified example of the fourth embodiment disclosed here.

The torque fluctuation absorber 1 according to a fourth embodiment of the disclosure will be described as follows with reference to FIG. 9. FIG. 9 is an enlarged sectional view schematically illustrating the configuration of the limiter portion 2 of the torque fluctuation absorber 1 according to the fourth embodiment. FIG. 10 is an enlarged sectional view schematically illustrating the configuration of the limiter portion 2 of the torque fluctuation absorber 1 according to a first modified example of the fourth embodiment. FIG. 11 is an enlarged sectional view schematically illustrating the configuration of the limiter portion 2 of the torque fluctuation absorber 1 according to a second modified example of the fourth embodiment.

The fourth embodiment is a modified example of the third embodiment. According to the torque fluctuation absorber 1 of the fourth embodiment, a support rivet 31 (see FIG. 9), a support rivet 32 (see FIG. 10), and a support rivet 33 (see FIG. 11) are utilized as any one of the support portion 10d arranged at the support plate 10 (see FIG. 8) and the support portion 13c arranged at the pressure plate 13 (see FIG. 8). Additionally, according to the fourth embodiment, the support rivet 31, the support rivet 32, and the support rivet 33 may be utilized as all of the support portion 10d and the support portion 13c. Other configurations of the fourth embodiment are similar to those of the third embodiment.

FIG. 9 is an enlarged sectional view schematically illustrating the configuration of the limiter portion 2 of the torque fluctuation absorber 1 according to the fourth embodiment. As illustrated in FIG. 9, the support rivet 31 (the second support portion or a second support rivet) serving as the radially outward support point at the disc spring 12 is riveted and fixed thereto instead of the support portion 13c (show in FIG. 8) of the pressure plate 13 according to the third embodiment. The multiple support rivets 31 are arranged at predetermined intervals in a circle on the disc spring 12. The circle of the disc spring 12 is located at a radially outward side of a contact portion of the disc spring 12 relative to the support portion 10d. The support rivets 31 have contact portions contacting the pressure plate 13 and each of the contact portions has a spherical surface.

FIG. 10 is an enlarged sectional view schematically illustrating the configuration of the limiter portion 2 of the torque fluctuation absorber 1 according to a first modified example of the fourth embodiment. As illustrated in FIG. 10, the support rivet 32 (the first support portion or a first support rivet) serving as the radially inward support point at the support plate 10 is riveted and fixed thereto instead of the support portion 10d (shown in FIG. 8) of the support plate 10. The multiple support rivets 32 are arranged at predetermined intervals in a circle on the support plate 10. The circle of the support plate 10 is located at a radially inward side of a contact portion of the disc spring 12 relative to the support portion 13c. The support rivets 32 have contact portions contacting the disc spring 12 and each of the contact portions has a spherical surface.

FIG. 11 is an enlarged sectional view schematically illustrating the configuration of the limiter portion 2 of the torque fluctuation absorber 1 according to a second modified example of the fourth embodiment. As illustrated in FIG. 11, the support rivet 33 (the first support portion or the first support rivet) serving as the radially inward support point at the disc spring 12 is riveted and fixed thereto instead of the support portion 10d (shown in FIG. 8) of the support plate 10. The multiple support rivets 33 are arranged at predetermined intervals in a circle on the disc spring 12. The circle of the disc spring 12 is located at the radially inward side of the contact portion of the disc spring 12 relative to the support portion 13c. The support rivets 33 have contact portions contacting the support plate 10 and each of the contact portions has a spherical surface.

The torque fluctuation absorber 1 according to the fourth embodiment has effects similar to those of the torque fluctuation absorber 1 according to the third embodiment.

Figure 12:
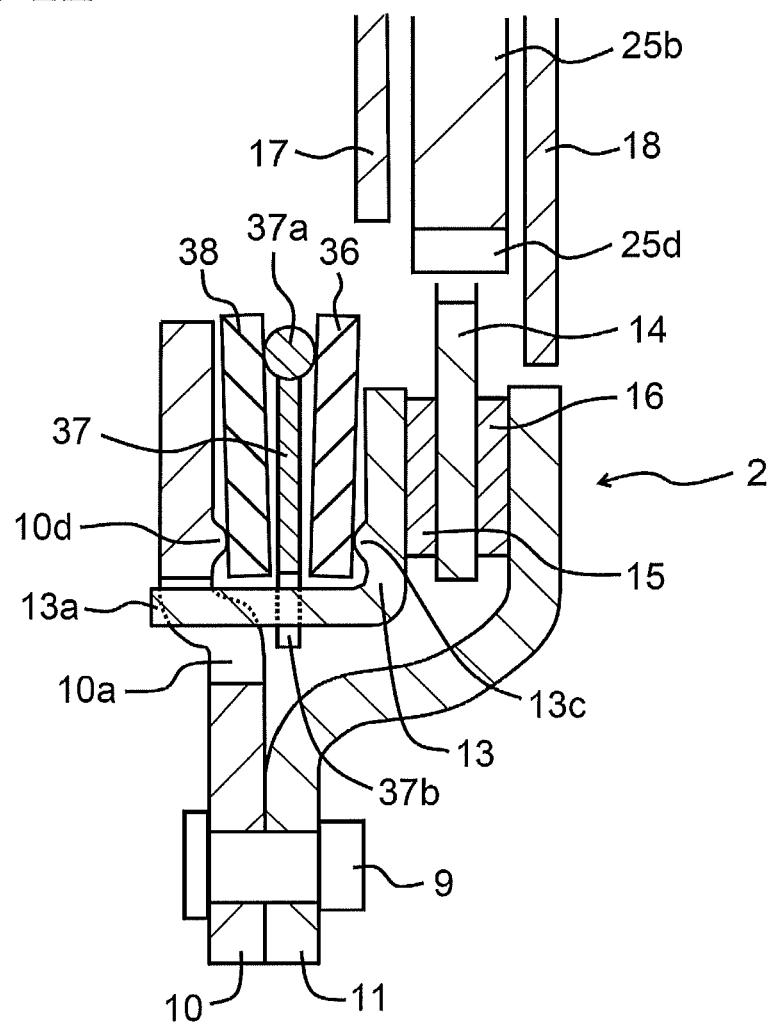
FIG. 12 is an enlarged sectional view schematically illustrating the configuration of the limiter portion of the torque fluctuation absorber according to a fifth embodiment disclosed here.

The torque fluctuation absorber 1 according to a fifth embodiment of the disclosure will be described as follows with reference to FIG. 12. FIG. 12 is an enlarged sectional view schematically illustrating the configuration of the limiter portion 2 of the torque fluctuation absorber 1 according to the fifth embodiment.

The fifth embodiment is a modified example of the second embodiment. According to the torque fluctuation absorber 1 of the fifth embodiment, multiple disc springs 36 and 38 are arranged in series with each other between the support plate 10 and the pressure plate 13 (the disc spring 36 serves as the first disc spring and the disc spring 38 serves as a second disc spring). The support portion 10d having a convex portion projecting toward the disc spring 38 is arranged at the support plate 10. The support portion 13c having a convex portion projecting toward the disc spring 36 is arranged at the pressure plate 13. A ring member 37 including a support portion 37a serving as the first support portion is arranged between the disc spring 36 and the disc spring 38. Each of the support portion 10d (the third support portion), the support portion 13c (the second support portion), and the support portion 37a (the first support portion) may be configured as the radially inward support point or the radially outward support point depending on the number of disc springs 36 and 38. As illustrated in FIG. 12, the two disc springs 36 and 38 are provided in the fifth embodiment; therefore, the support portion 10d and the support portion 13c serve as the radially outward support points and the support portion 37a serves as the radially inward support point. The support portion 37a positioned between the disc spring 36 and the disc spring 38 is a common support portion to the disc spring 36 and the disc spring 38. A round bar shaped into a circle may be applied as the support portion 37a. The support portion 37a is fixed (bonded) to an inner circumferential end of the annular and flat ring member 37 so that a radial position of the support portion 37a is determined by the inner circumferential end of the ring member 37 (the support portion 37a may be fixed to an outer circumferential end of the ring member 37). A recessed portion 37b is formed at the outer circumferential end of the ring member 37. The recessed portion 37b is engaged with the convex portion 13a so as not to rotate and so as to move in the axial direction (the recessed portion 37b may be a bore portion). Here, additionally, in a condition where the disc spring 38 is in an unloaded state, the disc spring 38 is arranged in a state where an inner circumferential end of the disc spring 38 is inclined toward the transmission (the second side) relative to an outer circumferential end of the disc spring 38. Meanwhile, in a condition where the disc spring 38 is arranged between the support portion 37a (the first support portion) and the support portion 10d (the third support portion), the disc spring 38 is arranged in a state where the inner circumferential end inclined toward the transmission relative to the outer circumferential end is shifted from a linear state relative to the outer circumferential end to be inclined toward the engine (the first side) relative to the outer circumferential end; therefore, the disc spring 38 is provided to be inclined axially in an opposite direction compared to the disc spring 38 being arranged in the unloaded state. Other configurations of the fifth embodiment are similar to those of the second embodiment.

The torque fluctuation absorber 1 of the fifth embodiment has effects similar to those of the second embodiment. In addition, the wear allowance in the limiter portion 2 or the hysteresis portion 4 according to the fifth embodiment may be further increased compared to that of the second embodiment.

Figure 13:
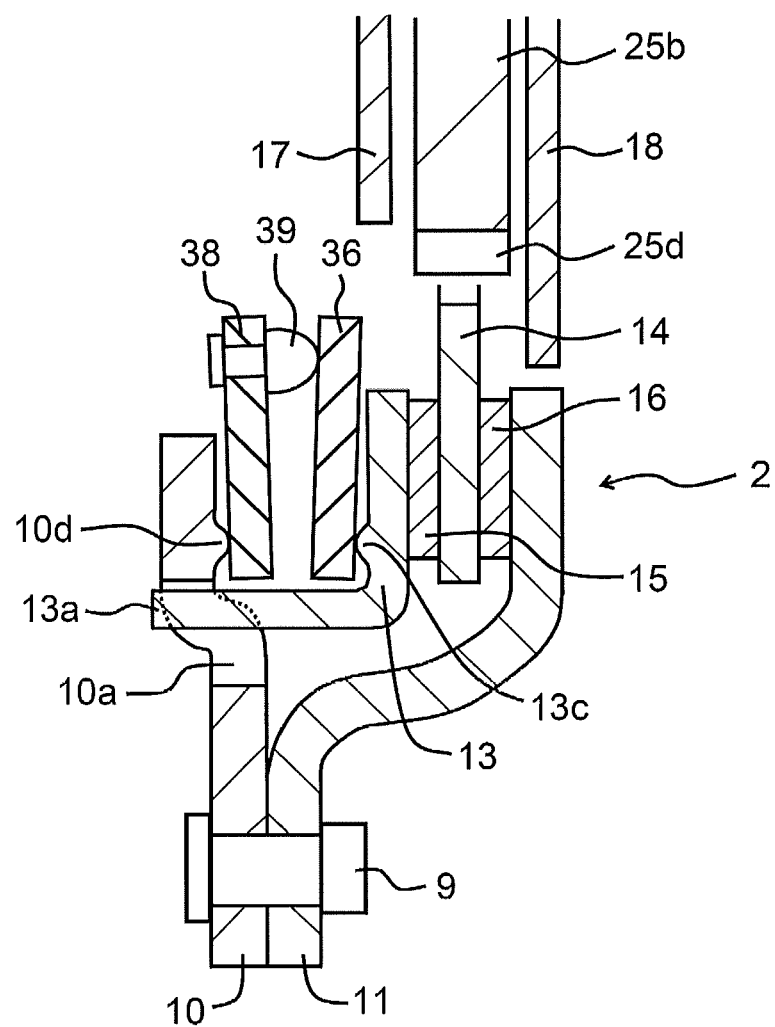
FIG. 13 is an enlarged sectional view schematically illustrating the configuration of the limiter portion of the torque fluctuation absorber according to a sixth embodiment disclosed here.

The torque fluctuation absorber 1 according to a sixth embodiment of the disclosure will be described as follows with reference to FIG. 13. FIG. 13 is an enlarged sectional view schematically illustrating the configuration of the limiter portion 2 of the torque fluctuation absorber 1 according to the sixth embodiment.

The sixth embodiment is a modified example of the fifth embodiment. In the fifth embodiment, the ring member 37 including the support portion 37a (shown in FIG. 12) is utilized. Alternatively, a support rivet 39 serving as the first support portion is applied in the sixth embodiment. The support rivet 39 is configured as the radially inward support point or the radially outward support point depending on the number of disc springs 36 and 38. As illustrated in FIG. 13, the two disc springs 36 and 38 are provided in the sixth embodiment; therefore, the support portion 10d and the support portion 13c serve as the radially outward support points and the support rivet 39 serves as the radially inward support point. The support rivet 39 is riveted and fixed to the disc spring 38. The support rivet 39 has a contact portion contacting the disc spring 36 and the contact portion has a spherical surface. In addition, the support rivet 39 may be fixed to the disc spring 36 instead of being fixed to the disc spring 38. The multiple support rivets 39 are arranged at predetermined intervals in a circle passing through the contact portions of the support rivets 39 relative to the disc spring 36. Other configurations of the sixth embodiment are similar to those of the fifth embodiment.

The torque fluctuation absorber 1 according to the sixth embodiment has similar effects to those of the fifth embodiment. In addition, an intermediate portion (the support portion 37a) positioned between the disc spring 36 and the disc spring 38 to separate the disc spring 36 and the disc spring 38 from each other is unnecessary in the sixth embodiment. Additionally, a guide member to determine a radial position of the intermediate portion is unnecessary in the sixth embodiment, resulting in a cost reduction.

Figure 14:
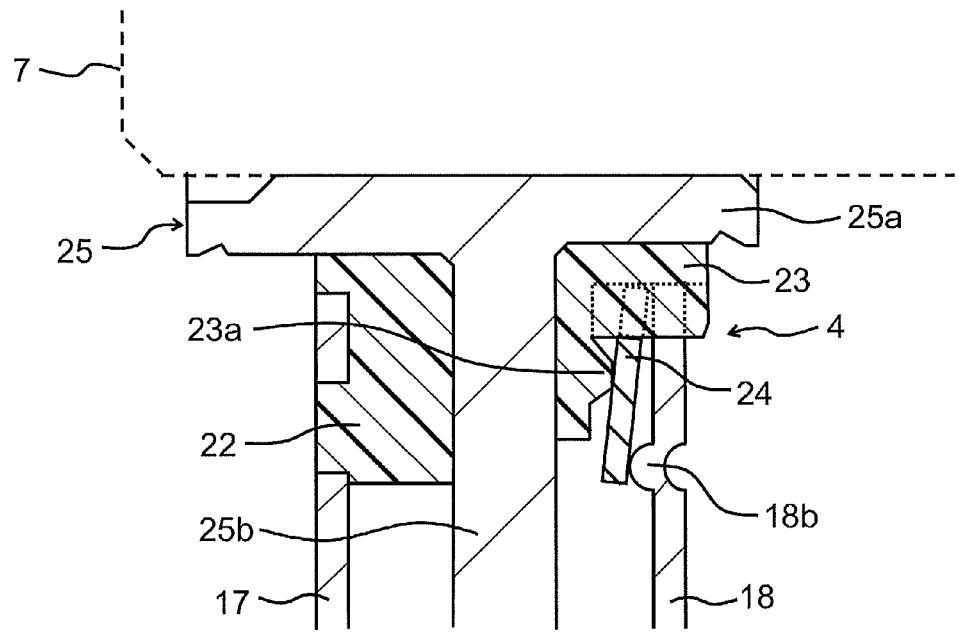
FIG. 14 is an enlarged sectional view schematically illustrating the configuration of the hysteresis portion of the torque fluctuation absorber according to a seventh embodiment disclosed here.

The torque fluctuation absorber 1 according to a seventh embodiment of the disclosure will be described as follows with reference to FIG. 14. FIG. 14 is an enlarged sectional view schematically illustrating the configuration of the hysteresis portion 4 of the torque fluctuation absorber 1 according to the seventh embodiment.

The seventh embodiment is a modified example of the first embodiment. According to the seventh embodiment, the second side plate 18 in the hysteresis portion 4 is partially pressed by a half blanking process so as to create a recessed and extruded portion; thereby, the support portion 18b serving as the first support portion is formed. Other configurations of the seventh embodiment are similar to those of the first embodiment.

The torque fluctuation absorber 1 according to the seventh embodiment has effects similar to those of the torque fluctuation absorber 1 according to the first embodiment.

Figure 15:
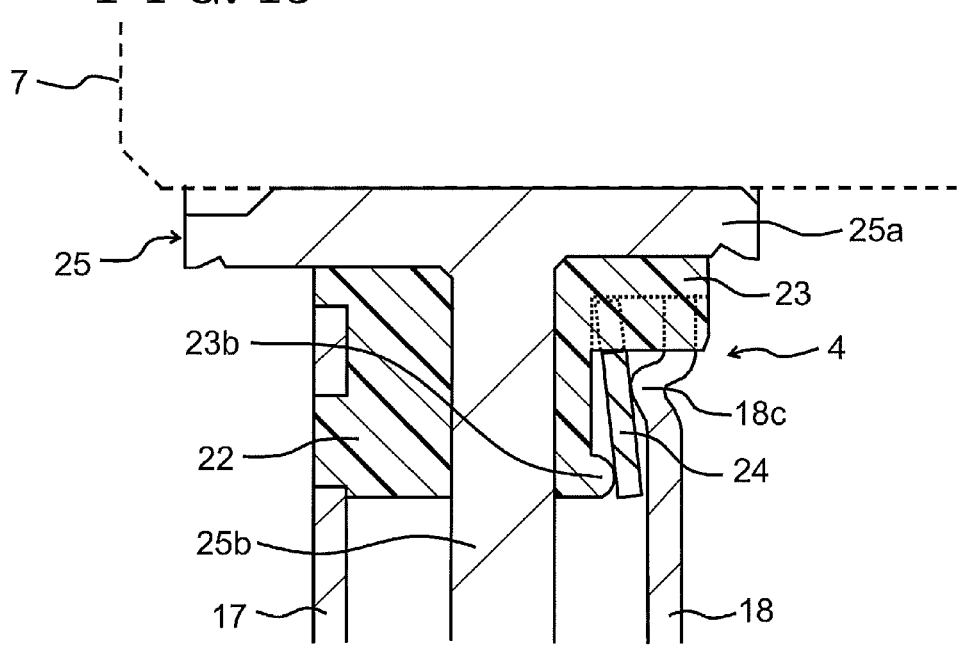
FIG. 15 is an enlarged sectional view schematically illustrating the configuration of the hysteresis portion of the torque fluctuation absorber according to an eighth embodiment disclosed here.

The torque fluctuation absorber 1 according to an eighth embodiment of the disclosure will be described as follows with reference to FIG. 15. FIG. 15 is an enlarged sectional view schematically Illustrating the configuration of the hysteresis portion 4 of the torque fluctuation absorber 1 according to the eighth embodiment.

The eighth embodiment is a modified example of the first embodiment. In the hysteresis portion 4 according to the eighth embodiment, the radially inward support point and the radially outward support point are radially reversed to those of the first embodiment. That is, a support portion 23b arranged at the second thrust member 23 serves as the radially outward support point. In addition, a support portion 18c arranged at the second side plate 18 serves as the radially inward support point. According to the eighth embodiment, the inclination of the disc spring 24 relative to the axial direction is reversed to the inclination of the disc spring 24 relative to the axial direction in the first embodiment. Other configurations of the eighth embodiment are similar to those of the first embodiment.

The torque fluctuation absorber 1 according to the eighth embodiment has effects similar to those of the torque fluctuation absorber 1 according to the first embodiment.

Figure 16:
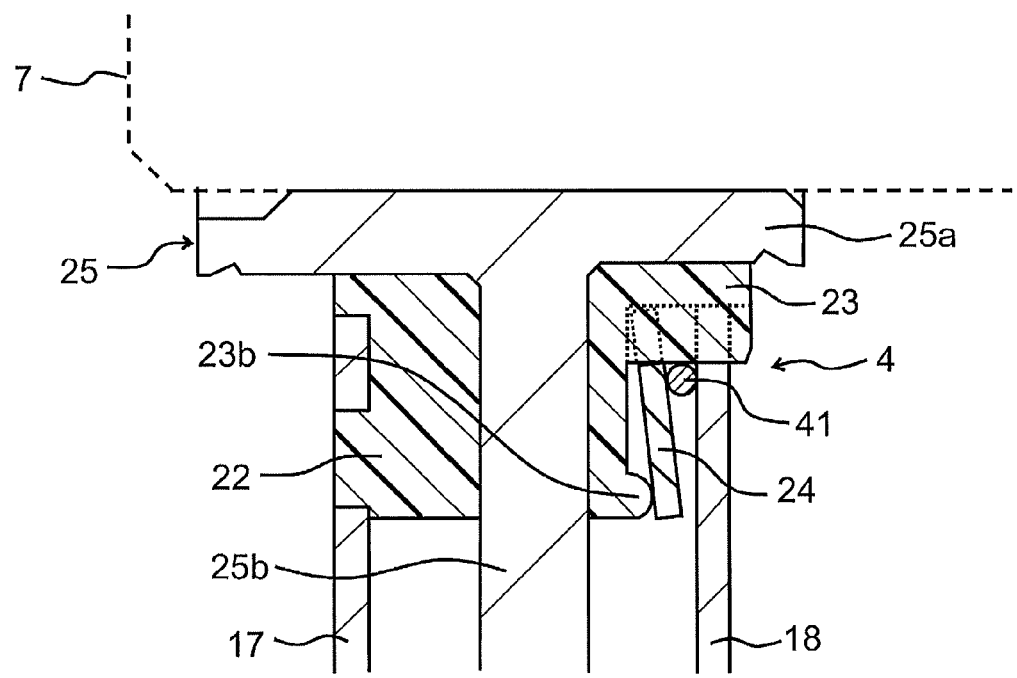
FIG. 16 is an enlarged sectional view schematically illustrating the configuration of the hysteresis portion of the torque fluctuation absorber according to a ninth embodiment disclosed here.

The torque fluctuation absorber 1 according to a ninth embodiment of the disclosure will be described as follows with reference to FIG. 16. FIG. 16 is an enlarged sectional view schematically illustrating the configuration of the hysteresis portion 4 of the torque fluctuation absorber 1 according to the ninth embodiment.

The ninth embodiment is a modified example of the eighth embodiment. In the eighth embodiment, the support portion 18c (see FIG. 15) serving as the radially inward support point is arranged at the second side plate 18. Alternatively, in the ninth embodiment, a support member 41 formed by a round bar shaped into a circle may be arranged between the disc spring 24 and the second side plate 18. A radial position of the support member 41 is determined by the second thrust member 23 located at a radially inward side of the support member 41. Other configurations of the ninth embodiment are similar to those of the eighth embodiment.

The torque fluctuation absorber 1 according to the ninth embodiment has effects similar to those of the torque fluctuation absorber 1 according to the eighth embodiment.

Figure 17:
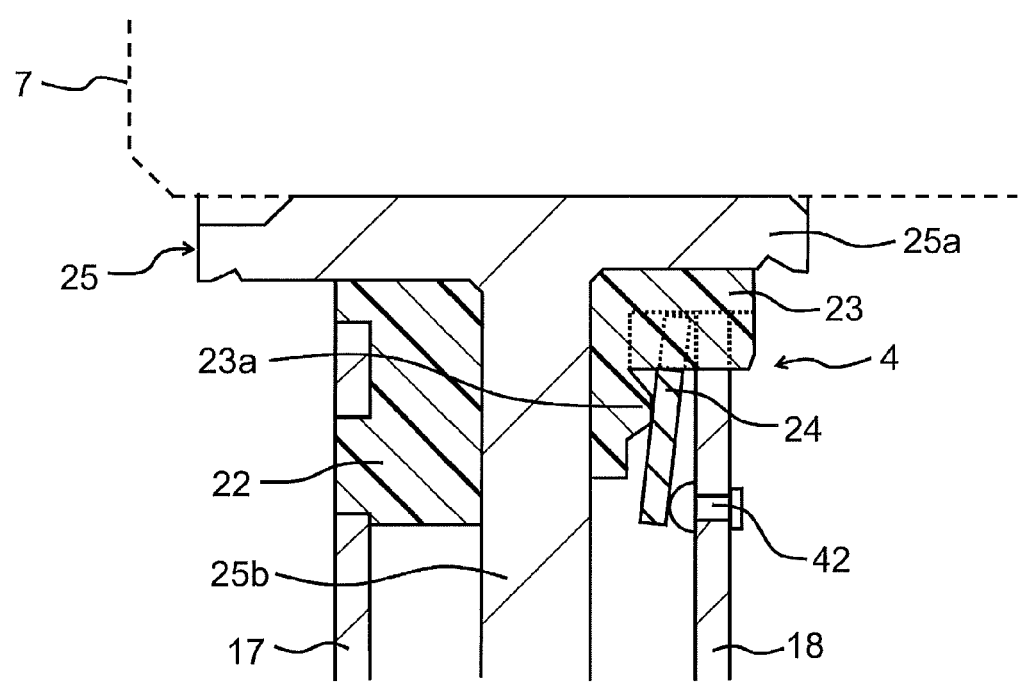
FIG. 17 is an enlarged sectional view schematically illustrating the configuration of the hysteresis portion of the torque fluctuation absorber according to a tenth embodiment disclosed here.
Figure 18:
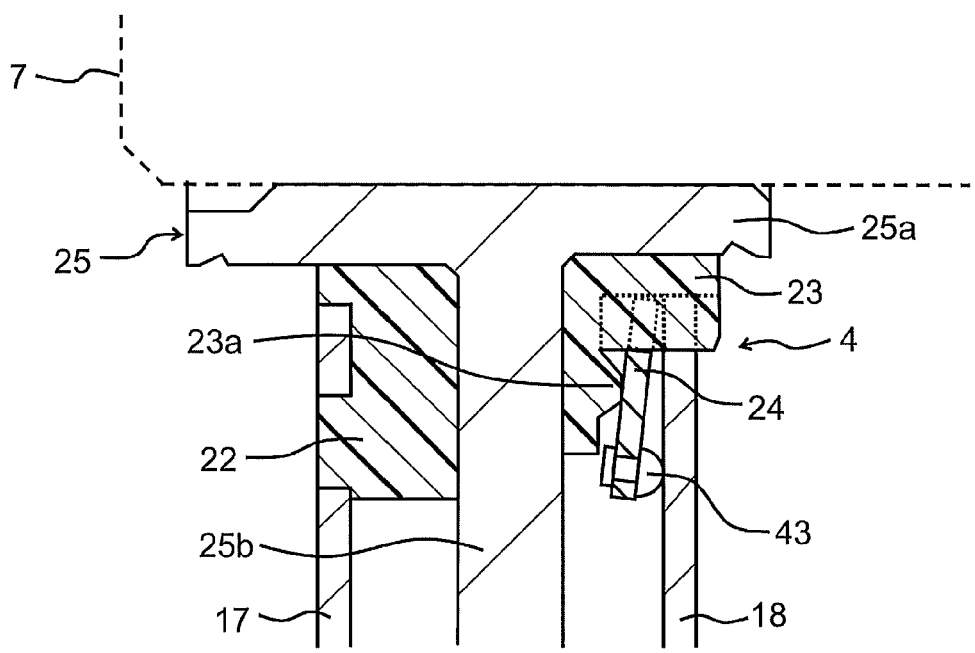
FIG. 18 is an enlarged sectional view schematically illustrating the configuration of the hysteresis portion of the torque fluctuation absorber according to a modified example of the tenth embodiment disclosed here.

The torque fluctuation absorber 1 according to a tenth embodiment of the disclosure will be described as follows with reference to FIG. 17. FIG. 17 is an enlarged sectional view schematically illustrating the configuration of the hysteresis portion 4 of the torque fluctuation absorber 1 according to the tenth embodiment. FIG. 18 is an enlarged sectional view schematically illustrating the configuration of the hysteresis portion 4 of the torque fluctuation absorber 1 according to a modified example of the tenth embodiment.

The tenth embodiment is a modified example of the first embodiment. According to the first embodiment, the support portion 18b is arranged at the second side plate 18. Alternatively, a support rivet 42 shown in FIG. 17 or a support rivet 43 shown in FIG. 18 is utilized in the tenth embodiment. Other configurations of the tenth embodiment are similar to those of the first embodiment.

As illustrated in FIG. 17, according to the tenth embodiment, the support rivet 42 serving as the radially outward support point is riveted and fixed to the second side plate 18 instead of the support portion 18b of the second side plate 18 according to the first embodiment. The multiple support rivets 42 are arranged at predetermined intervals in a circle on the second side plate 18. The circle of the second side plate 18 is located at a radially outward side of a contact portion of the disc spring 24 relative to the support portion 23a. The support rivets 42 have contact portions contacting the disc spring 24 and each of the contact portions has a spherical surface.

FIG. 18 is an enlarged sectional view schematically illustrating the configuration of the hysteresis portion 4 of the torque fluctuation absorber 1 according to a modified example of the tenth embodiment. As illustrated in FIG. 18, according to the modified example of the tenth embodiment, the support rivet 43 serving as the radially outward support point is riveted and fixed to the disc spring 24 instead of the support portion 18b (shown in FIG. 3) of the second side plate 18 according to the first embodiment. The multiple support rivets 43 are arranged at predetermined intervals in a circle on the disc spring 24. The circle of the disc spring 24 is located at the radially outward side of the contact portion of the disc spring 24 relative to the support portion 23a. The support rivets 43 have contact portions contacting the second side plate 18 and each of the contact portions has a spherical surface.

The torque fluctuation absorber 1 according to the tenth embodiment and the modified example of the tenth embodiment has effects similar to those of the torque fluctuation absorber 1 according to the first embodiment.

Figure 19:
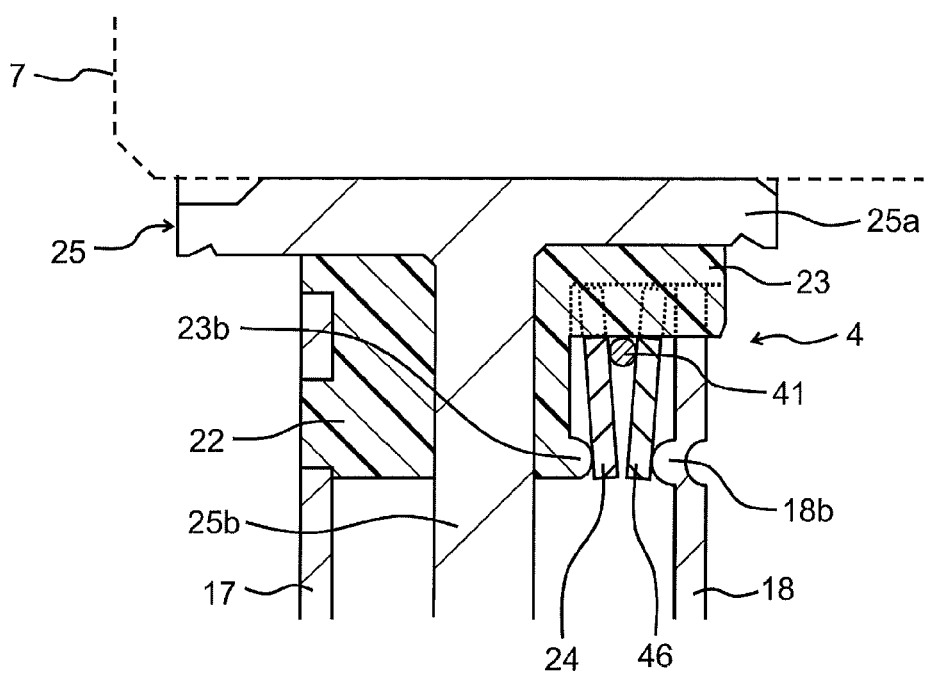
FIG. 19 is an enlarged sectional view schematically illustrating the configuration of the hysteresis portion of the torque fluctuation absorber according to an eleventh embodiment disclosed here.

The torque fluctuation absorber 1 according to an eleventh embodiment of the disclosure will be described as follows with reference to FIG. 19. FIG. 19 is an enlarged sectional view schematically illustrating the configuration of the hysteresis portion 4 of the torque fluctuation absorber 1 according to the eleventh embodiment.

The eleventh embodiment is a modified example of the ninth embodiment. Plural disc springs (the disc spring 24 and a disc spring 46) is arranged between the second thrust member 23 and the second side plate 18 so as to be in series with each other in the axial direction. The support portion 23b having a convex portion projecting toward the disc spring 24 is arranged at the second thrust member 23. The support portion 18b having a convex portion projecting toward the disc spring 46 is arranged at the second side plate 18. The support member 41 is arranged between the disc spring 24 and the disc spring 46. Whether the support portion 23b, the support portion 18b, and the support member 41 serve as the radially inward support point or the radially outward support point is determined by the number of disc springs 24 and 46. As shown in FIG. 19, the two disc springs 24 and 46 are utilized in the eleventh embodiment. Therefore, the support portion 23b and the support portion 18b serve as the radially outward support points and the support member 41 serves as the radially inward support point. The support member 41 positioned between the disc spring 24 and the disc spring 46 functions as a common support point to the disc spring 24 and the disc spring 46. The support member 41 may be formed by the round bar shaped into the circle. The radial position of the support member 41 is determined by the second thrust member 23 located at the radially inward side of the support member 41. Other configurations of the eleventh embodiment are similar to those of the ninth embodiment.

The torque fluctuation absorber 1 according to the eleventh embodiment has effects similar to those of the torque fluctuation absorber 1 according to the ninth embodiment. In addition, the wear allowance in the limiter portion 2 or the hysteresis portion 4 according to the eleventh embodiment may be increased by the plural disc springs 24 and 46 compared to that of the ninth embodiment.

The aforementioned embodiments and the modified example of the aforementioned embodiments may be modified or adjusted or various combinations or selections of the components described in the disclosure are applicable as long as such combinations or selections are made within the entire disclosure (including a range defined in the claims of the disclosure and the attached drawings) and on the basis of the technical purpose of the disclosure. In other words, various modifications that may be acquired by those skilled in accordance with the entire disclosure and on the basis of the technical purpose of the disclosure may be included in the aforementioned embodiments of the disclosure.

As described above, according to the aforementioned embodiments, the torque fluctuation absorber 1 includes the support plate 10, the second side plate 18, the pressure plate 13 arranged to be axially separated from the support plate 10, the second thrust member 23 arranged to be axially separated from the second side plate 18, the annular and dish-shaped disc spring 12 arranged between the support plate 10 and the pressure plate 13, the annular and dish-shaped disc spring 24 arranged between the second side plate 18 and the second thrust member 23, the first support portion 10d, 27, 32, 33 arranged between the support plate 10 and the disc spring 12 and being partially or continuously in contact with the disc spring 12 on the circle passing through the predetermined radial portion of the support plate 10, the first support portion 18b arranged between the second side plate 18 and the disc spring 24 and being partially or continuously in contact with the disc spring 24 on the circle passing through the predetermined radial portion of the second side plate 18, the second support portion 13c, 28, 31 arranged between the pressure plate 13 and the disc spring 12 and being partially or continuously in contact with the disc spring 12 on the circle passing through the predetermined radial portion of the pressure plate 13, the predetermined radial portion being radially different from the predetermined radial portion of the support plate 10, and the second support portion 23a arranged between the second thrust member 23 and the disc spring 24 and being partially or continuously in contact with the disc spring 24 on the circle passing through the predetermined radial portion of the second thrust member 23, the predetermined radial portion being radially different from the predetermined radial portion of the second side plate 18.

According to the aforementioned embodiments, in a condition where the disc spring 12 or 24 is in the unloaded state, the disc spring 12 or 24 is arranged in a state where then inner circumferential end of the disc spring 12 or 24 is inclined toward the engine relative to the outer circumferential end of the disc spring 12 or 24. In a condition where the disc spring 12 or 24 is arranged between the first support portion 10d, 27, 32, 33 and the second support portion 13c, 28, 31 or between the first support portion 18b and the second support portion 23a, the disc spring 12 or 24 is arranged in a state where the inner circumferential end inclined toward the engine relative to the outer circumferential end is shifted beyond the linear state relative to the outer circumferential end to be inclined toward the transmission relative to the outer circumferential end, the disc spring 12 or 24 being provided to be inclined axially in an opposite direction compared to the disc spring 12 or 24 arranged under the unloaded state.

According to the aforementioned first and second embodiments, the first support portion 27 is the first support member 27 including the round bar formed into the circle. The first support member 27 is held by the support plate 10.

According to the aforementioned embodiments, the first support portions 10d, 18b are the support portions 10d and 18b formed at the support plate 10 and the second side plate 18.

According to the aforementioned fourth embodiment, the first support portion 32 or 33 includes the plural first support rivets 32 or 33 (the support rivets) fixed to the support plate 10 or the disc spring 12.

According to the aforementioned first and second embodiments, the second support portion 28 is the second support member 28 including the round bar formed into the circle. The second support member 28 is held by the pressure plate 13.

According to the aforementioned embodiments, the second support portions 13c and 23a are the support portions 13c and 23a formed at the pressure plate 13 and the second thrust member 23.

According to the aforementioned fourth embodiment, the second support portion includes the plural second support rivets 31 (the support rivets) fixed to the pressure plate 13 or the disc spring 12.

According to the aforementioned embodiments, the support plate 10 and the pressure plate 13 include the guide portion 10c and the guide portion 13a for determining the radial position of the inner circumferential end and the outer circumferential end of the disc spring 12.

According to the aforementioned embodiments, each of the guide portion 10c and the guide portion 13a has the annular rib shape extending continuously circumferentially.

According to the aforementioned embodiments, the guide portion 10c has the surface facing the inner circumferential end or the outer circumferential end of the disc spring 12. At least a portion of the surface of the guide portion 100 is formed into the tapered shape that has the inclined surface.

According to the aforementioned embodiments, the guide portion 13a is the convex portion 13a formed at the pressure plate 13. The support plate 10 includes the bore portion 10a with which the convex portion 13a is engaged so as not to rotate and so as to move axially.

According to the aforementioned fifth embodiment, the torque fluctuation absorber 1 further includes the annular and dish-shaped disc spring 38 arranged between the support plate 10 and the support portion 37a and being in contact with the support portion 37a, and the support portion 10d arranged between the support plate 10 and the disc spring 38 and being partially or continuously in contact with the disc spring 38 on the circle passing through the predetermined radial portion of the support plate 10, the predetermined radial portion being in a radially different position from the support portion 37a. In a condition where the disc spring 38 is in the unloaded state, the disc spring 38 is arranged in a state where the inner circumferential end of the disc spring 38 is inclined toward the transmission relative to the outer circumferential end of the disc spring 38. In a condition where the disc spring 38 is arranged between the support portion 37a and the support portion 10d, the disc spring 38 is arranged in a state where the inner circumferential end inclined toward the transmission relative to the outer circumferential end is shifted from the linear state relative to the outer circumferential end to be inclined toward the engine relative to the outer circumferential end, the disc spring 38 being provided to be inclined axially in an opposite direction compared to the disc spring 38 being arranged in the unloaded state.

According to the aforementioned fifth embodiment, the support portion 37a includes the round bar formed into the circle.

According to the aforementioned fifth embodiment, the torque fluctuation absorber 1 further includes the annular and flat ring member 37 arranged between the disc spring 36 and the disc spring 38. The support portion 37a is bonded to the inner circumferential end or the outer circumferential end of the ring member 37. The radial position of the ring member 37 is determined by the support plate 10 or the pressure plate 13.

According to the aforementioned fifth embodiment, the support plate 10 or the pressure plate 13 has the guide portion 10a or 13a for determining the radial position of the inner circumferential portion or the outer circumferential portion of the support portion 37a.

According to the aforementioned sixth embodiment, the first support portion 39 includes the plural support rivets 39 fixed to the disc spring 36 or the disc spring 38.

According to the aforementioned fifth and sixth embodiments, the second support portion 13c is a portion (the support portion 13c) formed at the pressure plate 13, and the third support portion 10d is a portion (the support portion 10d) formed at the support plate 10.

According to the aforementioned embodiments, the pressure plate 13 is slidably in a firm contact with the first friction member 15, and the first friction member 15 wears to cause the pressure plate 13 to shift in the direction in which the pressure plate 13 separates from the support plate 10.

According to the aforementioned embodiments, the second thrust member 23 is made of resin and is slidably in a firm contact with a different member from the second thrust member 23, and the second thrust member 23 wears to shift in the direction in which the second thrust member 23 separates from the second side plate 18.

According to the torque fluctuation absorber 1 configured as described above, the first support portion 10d, 27, 32, 33, 37a, 18b, the second support portion 13c, 28, 31, 23a, and third support portion 10d for the disc springs 12, 24, 36, 38, 46 in the limiter portion 2 or the hysteresis portion 4 are provided in a contact manner with the disc springs 12, 24, 36, 38, 46 so as to be arranged radially at different positions from one another. Therefore, each of the disc springs 12, 24, 36, 38, 46 may be compressed to be assembled on the torque fluctuation absorber 1 in a state where the inner circumferential end is beyond the linear state relative to the outer circumferential end. As a result, the wear allowance in the limiter portion 2 or the hysteresis portion 4 may be increased; thereby, the lifetime of the torque fluctuation absorber 1 may be refrained from shortening.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber, comprising:
a first annular member;
a second annular member arranged to be axially separated from the first annular member;
an annular dish-shaped first disc spring arranged between the first annular member and the second annular member;
a first support portion arranged between the first annular member and the first disc spring and being partially or continuously in contact with the first disc spring on a circle passing through a first predetermined radial portion of the first annular member;
a second support portion arranged between the second annular member and the first disc spring and being partially or continuously in contact with the first disc spring on a circle passing through a second predetermined radial portion of the second annular member;
the second predetermined radial portion being radially different from the first predetermined radial portion of the first annular member;
wherein the first annular member includes a surface facing the first disc spring, the surface of the first annular member being provided with a first recess, the first support portion being positioned in the first recess;
wherein the second annular member includes a surface facing the first disc spring, the surface of the second annular member being provided with a second recess, the second support portion being positioned in the second recess;
a third annular member;
a fourth annular member axially separated from the third annular member;
an annular dish-shaped second disc spring arranged between the third annular member and the fourth annular member, the second disc spring possessing opposing facing surfaces;
a portion of the third annular member protruding towards the second disc spring to define a protruding third support portion in partial or continuous contact with one of the surfaces of the second disc spring; and
a portion of the fourth annular member protruding towards the second disc spring to define a protruding fourth support portion in partial or continuous contact with an other of the surfaces of the second disc spring.

2. The torque fluctuation absorber of claim 1,
wherein the protruding third support portion is in partial or continuous contact with the second disc spring on a circle passing through a third predetermined radial portion of the third annular member; and
wherein the protruding fourth support portion is in partial or continuous contact with the second disc spring on a circle passing through a fourth predetermined radial portion of the fourth annular member, the fourth predetermined radial portion being radially different from the third predetermined radial portion of the third annular member.

* * * * *